(12) United States Patent
Inoue et al.

(10) Patent No.: US 9,738,133 B2
(45) Date of Patent: Aug. 22, 2017

(54) REFRIGERATION CYCLE DEVICE

(71) Applicant: DENSO CORPORATION, Kariya, Aichi-pref. (JP)

(72) Inventors: Seiji Inoue, Nukata-gun (JP); Masayuki Takeuchi, Nukata-gun (JP); Takashi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 285 days.

(21) Appl. No.: 14/415,110

(22) PCT Filed: Jun. 26, 2013

(86) PCT No.: PCT/JP2013/003987
§ 371 (c)(1),
(2) Date: Jan. 15, 2015

(87) PCT Pub. No.: WO2014/013679
PCT Pub. Date: Jan. 23, 2014

(65) Prior Publication Data
US 2015/0191072 A1 Jul. 9, 2015

(30) Foreign Application Priority Data

Jul. 18, 2012 (JP) .................... 2012-159326
Jun. 3, 2013 (JP) .................... 2013-116717

(51) Int. Cl.
*F25B 6/04* (2006.01)
*B60H 1/22* (2006.01)
(Continued)

(52) U.S. Cl.
CPC ..... *B60H 1/00278* (2013.01); *B60H 1/00885* (2013.01); *B60H 1/22* (2013.01);
(Continued)

(58) Field of Classification Search
CPC .................. F25B 2341/0662; B60H 1/00278
See application file for complete search history.

(56) References Cited

U.S. PATENT DOCUMENTS

| 5,878,589 A | 3/1999 | Tanaka et al. |
| 2008/0145731 A1 | 6/2008 | Sakajo et al. |

(Continued)

FOREIGN PATENT DOCUMENTS

| JP | H09-290622 A | 11/1997 |
| JP | H11-023081 A | 1/1999 |

(Continued)

OTHER PUBLICATIONS

Machine translation JP 2010-260450 Kawase.*
(Continued)

*Primary Examiner* — Jianying Atkisson
*Assistant Examiner* — Mark L Greene
(74) *Attorney, Agent, or Firm* — Harness, Dickey & Pierce, P.L.C.

(57) ABSTRACT

A refrigeration cycle device includes an air heat exchanger that heats air to be blown into an interior of a vehicle compartment using refrigerant discharged from a compressor, a high-stage side expansion valve decompressing the refrigerant flowing out of the air heat exchanger, and a battery heat exchanger that heats air to be blown to a battery using the refrigerant decompressed by the high-stage side expansion valve. In an air heating-warming up mode of heating the air for the interior and the air for the battery, a refrigerant discharge capacity of the compressor is controlled such that an air temperature for the interior approaches a target air temperature, and an opening degree of the high-stage side expansion valve is controlled such that a battery temperature becomes within a predetermined reference temperature range. A selector switch allows a pas- (Continued)

AIR HEATING - WARMING UP MODE senger to select which operation of air conditioning or warming-up is prioritized.

8 Claims, 12 Drawing Sheets

(51) Int. Cl.

| | | |
|---|---|---|
| *B60H 1/00* | (2006.01) | |
| *B60H 1/32* | (2006.01) | |
| *H01M 10/615* | (2014.01) | |
| *H01M 10/663* | (2014.01) | |
| *H01M 10/6563* | (2014.01) | |
| *F25B 41/04* | (2006.01) | |
| *B60L 1/00* | (2006.01) | |
| *B60L 11/18* | (2006.01) | |
| *B60L 15/20* | (2006.01) | |

(52) U.S. Cl.
CPC ............ *B60H 1/3213* (2013.01); *B60L 1/003* (2013.01); *B60L 1/006* (2013.01); *B60L 11/1805* (2013.01); *B60L 11/1874* (2013.01); *B60L 11/1875* (2013.01); *B60L 11/1879* (2013.01); *B60L 15/20* (2013.01); *F25B 6/04* (2013.01); *F25B 41/04* (2013.01); *H01M 10/615* (2015.04); *H01M 10/6563* (2015.04); *H01M 10/663* (2015.04); *B60H 2001/00307* (2013.01); *B60H 2001/3258* (2013.01); *B60H 2001/3275* (2013.01); *B60L 2240/34* (2013.01); *B60L 2240/421* (2013.01); *B60L 2240/545* (2013.01); *B60L 2240/662* (2013.01); *F25B 2341/0662* (2013.01); *F25B 2600/2513* (2013.01); *Y02T 10/645* (2013.01); *Y02T 10/7005* (2013.01); *Y02T 10/705* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

| | | | | |
|---|---|---|---|---|
| 2010/0319393 | A1* | 12/2010 | Ikegami | ............... F25B 41/00 62/500 |
| 2011/0016896 | A1* | 1/2011 | Oomura | ........... B60H 1/00785 62/155 |
| 2011/0139397 | A1* | 6/2011 | Haussmann | ....... B60H 1/00278 165/43 |

FOREIGN PATENT DOCUMENTS

| | | |
|---|---|---|
| JP | 2005233535 A | 9/2005 |
| JP | 2008-027797 A | 2/2008 |
| JP | 2008308080 A | 12/2008 |
| JP | 2010-260450 A | 11/2010 |
| JP | 2012-030663 A | 2/2012 |
| JP | 2012081932 A | 4/2012 |
| JP | 2012236577 A | 12/2012 |
| JP | 2013220712 A | 10/2013 |

OTHER PUBLICATIONS

U.S. Appl. No. 14/384,392, filed Sep. 11, 2014, Takeuchi et al.
International Search Report and Written Opinion (in Japanese with English Translation) for PCT/JP2013/003987, mailed Aug. 20, 2013; ISA/JP.

* cited by examiner

AIR HEATING – WARMING UP MODE

AIR HEATING - NON-TEMPERATURE ADJUSTMENT MODE

AIR COOLING − WARMING UP MODE

AIR COOLING – NON-TEMPERATURE ADJUSTMENT MODE

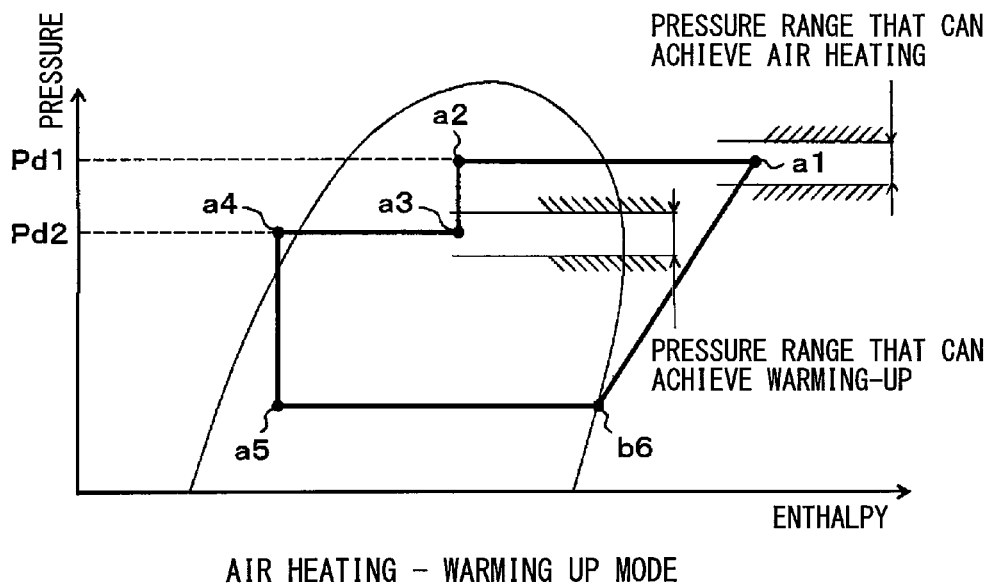
AIR HEATING − WARMING UP MODE
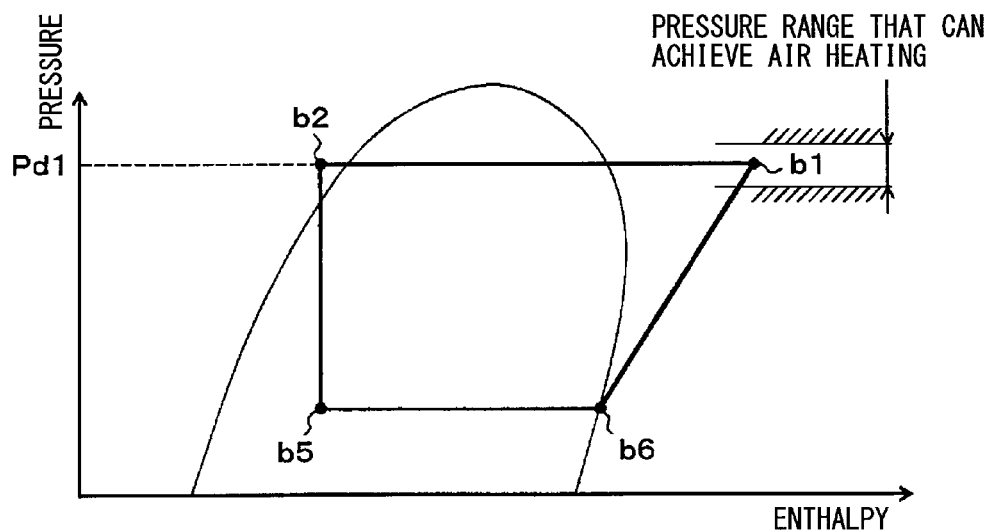
AIR HEATING − NON-TEMPERATURE ADJUSTMENT MODE

AIR COOLING – WARMING UP MODE

AIR COOLING – NON-TEMPERATURE ADJUSTMENT MODE

AIR HEATING - COOLING MODE

AIR COOLING – COOLING MODE

AIR HEATING − NON-TEMPERATURE ADJUSTMENT MODE

WARMING-UP PRIORITY MODE

WARMING-UP PRIORITY MODE

WARMING-UP PRIORITY MODE

REFRIGERATION CYCLE DEVICE

CROSS REFERENCE TO RELATED APPLICATIONS

This application is a U.S. National Phase Application under 35 U.S.C. 371 of International Application No. PCT/JP2013/003987 filed on Jun. 26, 2013 and published in Japanese as WO 2014/013679 A1 on Jan. 23, 2014. This application is based on and claims the benefit of priority from Japanese Patent Applications No. 2012-159326 filed on Jul. 18, 2012, and No. 2013-116717 filed on Jun. 3, 2013. The entire disclosures of all of the above applications are incorporated herein by reference.

FIELD OF THE INVENTION

The present disclosure relates to a refrigeration cycle device for adjusting temperatures of a plurality of temperature adjustment objects.

BACKGROUND ART

In a related art, for example, Patent Document 1 discloses a vapor compression refrigeration cycle device that is adapted to adjust temperatures of a plurality of temperature adjustment objects (fluids to be temperature adjustment). The refrigeration cycle device disclosed in Patent Document 1 is mounted on a fuel cell vehicle. In order to achieve heating of an interior of a vehicle and warming up a fuel cell, the refrigeration cycle device is designed to heat different kinds of fluids to be temperature adjustment, including air (blast air) to be blown into the vehicle interior and a heat medium for warming-up of the fuel cell.

More specifically, the refrigeration cycle device disclosed in Patent Document 1 constitutes a supercritical refrigeration cycle in which a pressure of high-pressure refrigerant discharged from a compressor is equal to or higher than a critical pressure of the refrigerant. The refrigeration cycle device includes two heat exchangers for heating that dissipates heat from the refrigerant into the heat medium for warming up of the fuel cell or air to thereby heat the heat medium or air. These two heat exchangers are connected in series with respect to a refrigerant flow via a decompressor.

An upstream side heat exchanger disposed on the upstream side of the refrigerant flow operates to heat the heat medium to a high temperature of 100° C. or higher by exchanging heat between the refrigerant discharged from the compressor and the heat medium for warming up of the fuel cell. Further, a downstream side heat exchanger disposed on the downstream side of the refrigerant flow operates to heat the air to the temperature (of about 40 to 60° C.) required for heating by exchanging heat between the refrigerant decompressed by the decompressor and the air to be blown into the vehicle interior.

PRIOR ART LIST

Patent Document

Patent Document 1: Japanese Unexamined Patent Application Publication No. 2005-233535

SUMMARY OF INVENTION

As a result of studies by the inventors of the present application, the refrigeration cycle device disclosed in Patent Document 1 is used for warming up the fuel cell, and hence the heat medium for warming up the fuel cell has to be heated to a high temperature of 100° C. or higher. On the other hand, a battery (electric cell) mounted on the electric vehicle or hybrid vehicle needs warming-up as its discharge efficiency is reduced at low temperature, but might be degraded when being warmed up at unnecessarily high temperature only to become unusable.

In the refrigeration cycle device of Patent Document 1, however, the pressure of refrigerant in the upstream side heat exchanger is higher than that of the refrigerant in the downstream side heat exchanger, so that the temperature of heat medium heated by the upstream side heat exchanger becomes higher than that of air heated by the downstream side heat exchanger. For this reason, if the refrigeration cycle device of Patent Document 1 is applied, for example, to the electric vehicle to heat the heat medium for warming up the battery in the upstream side heat exchanger, the battery might be degraded.

In other words, the refrigerant cycle device of Patent Document 1 cannot appropriately adjust the temperature of the battery in a temperature range lower than that of the air.

In view of the foregoing points, it is an object of the present disclosure to provide a refrigeration cycle device that can appropriately adjust the temperature of a battery in a temperature range lower than that of the air, while adjusting the temperature of air to be blown into the vehicle interior (i.e., a space to be air conditioned).

A refrigeration cycle device according to an aspect of the present disclosure includes a compressor, an air heat exchanger, a high-stage side decompressor, a battery heat exchanger, a low-stage side decompressor, an exterior heat exchanger and an accumulator. The compressor compresses and discharges a refrigerant. The air heat exchanger heats air to be blown into a space to be air conditioned using the refrigerant discharged from the compressor as a heat source. The high-stage side decompressor decompresses the refrigerant flowing out of the air heat exchanger, and is configured to be capable of changing an opening degree of the high-stage side decompressor. The battery heat exchanger heats a battery using the refrigerant decompressed by the high-stage side decompressor as another heat source. The low-stage side decompressor decompresses the refrigerant flowing out of the battery heat exchanger. The exterior heat exchanger exchanges heat between the refrigerant decompressed by the low-stage side decompressor and outside air to evaporate the refrigerant. Furthermore, the accumulator separates the refrigerant flowing out of the exterior heat exchanger into gas-phase refrigerant and liquid-phase refrigerant, to allow the separated gas-phase refrigerant to flow toward a suction side of the compressor.

Thus, the air heat exchanger can heat the air by exchanging heat between the air and the refrigerant discharged from the compressor. Further, the battery heat exchanger can heat the battery using the refrigerant decompressed by the high-stage side decompressor as a heat source. That is, the temperatures of a plurality of temperature adjustment objects can be adjusted.

The air heat exchanger uses the refrigerant discharged from the compressor as the heat source, while the battery heat exchanger uses the refrigerant decompressed by the high-stage side decompressor as another heat source. As a result, the temperature of the refrigerant that dissipates heat therefrom in the battery heat exchanger is lower than that of the refrigerant that dissipates heat therefrom in the air heat exchanger. Thus, the battery temperature as the temperature of the battery can be adjusted to remain within a temperature range lower than that of the air.

The term "battery" as applied in the present disclosure means not only a secondary cell that enables repeated discharge of electric power by charging, but also a primary battery that can only discharge the electric power. This kind of battery needs warming-up because the charging efficiency or discharge efficiency is drastically reduced with decreasing battery temperature. When being warmed up to an unnecessary high temperature, the battery might be degraded to be unusable. That is, when warming up the battery, the warming-up needs to be performed so as to maintain the battery temperature within the predetermined reference temperature range.

In contrast, in the present disclosure, because the high-stage side decompressor is provided which is capable of changing its opening degree, it can easily adjust the temperature of the refrigerant decompressed by the high-stage side decompressor. Therefore, the refrigeration cycle device of the present disclosure can very easily adjust the battery temperature within the reference temperature range.

Further, even though the flow rate of the refrigerant circulating through the cycle fluctuates due to the adjustment of the opening degree of the high-stage side decompressor, the accumulator can suppress the occurrence of liquid compression of the compressor. Thus, the refrigeration cycle device is provided which can appropriately adjust the battery temperature within a temperature range lower than that of the air.

Specifically, a target temperature determination portion may be provided for determining a target temperature of air to be blown into the space to be air conditioned. Further, the refrigerant discharge capacity of the compressor may be controlled such that the temperature of air heated by the air heat exchanger approaches the target temperature, and an opening degree of the high-stage side decompressor may be controlled to set the battery temperature within the predetermined reference temperature range.

With the arrangement described above, in the air heating-warming up mode of heating the air and adjusting the temperature (warming up) of the battery, the refrigerant discharge capacity of the compressor is adjusted to thereby adjust the temperature of air, and the opening degree of the high-stage side decompressor is adjusted to thereby adjust the battery temperature. Accordingly, the battery temperature can be adjusted or controlled without being affected by the adjustment of the temperature of the air.

Further, in an air heating-non-temperature adjustment mode in which the air is heated without adjusting the temperature of the battery, the opening degree of the high-stage side decompressor is controlled such that a saturated temperature of the refrigerant in the heat exchanger for the battery is lower than an outside air temperature.

Thus, in the air heating-non-temperature adjustment mode, the temperature of the refrigerant flowing into the battery heat exchanger becomes lower than the outside air temperature, and thereby it can evaporate the refrigerant in the battery heat exchanger. Thus, in the air heating-non-temperature adjustment mode, the refrigeration cycle device can prevent the liquid-phase refrigerant from being retained in the battery heat exchanger and failing to flow out of the battery heat exchanger.

Accordingly, when switching between the air heating-warming up mode and the air heating-non-temperature adjustment mode, the large fluctuations in flow rate of the refrigerant circulating through the refrigerant cycle can be suppressed, thereby leading to reduction in size of the accumulator.

BRIEF DESCRIPTION OF DRAWINGS

FIG. 5 is a Mollier chart showing the state of refrigerant in the air heating-warming up mode of the refrigeration cycle device in the first embodiment;

FIG. 6 is a Mollier chart showing the state of refrigerant in the air heating-non-temperature adjustment mode of the refrigeration cycle device in the first embodiment;

DESCRIPTION OF EMBODIMENTS (First Embodiment)

Figure 1A:
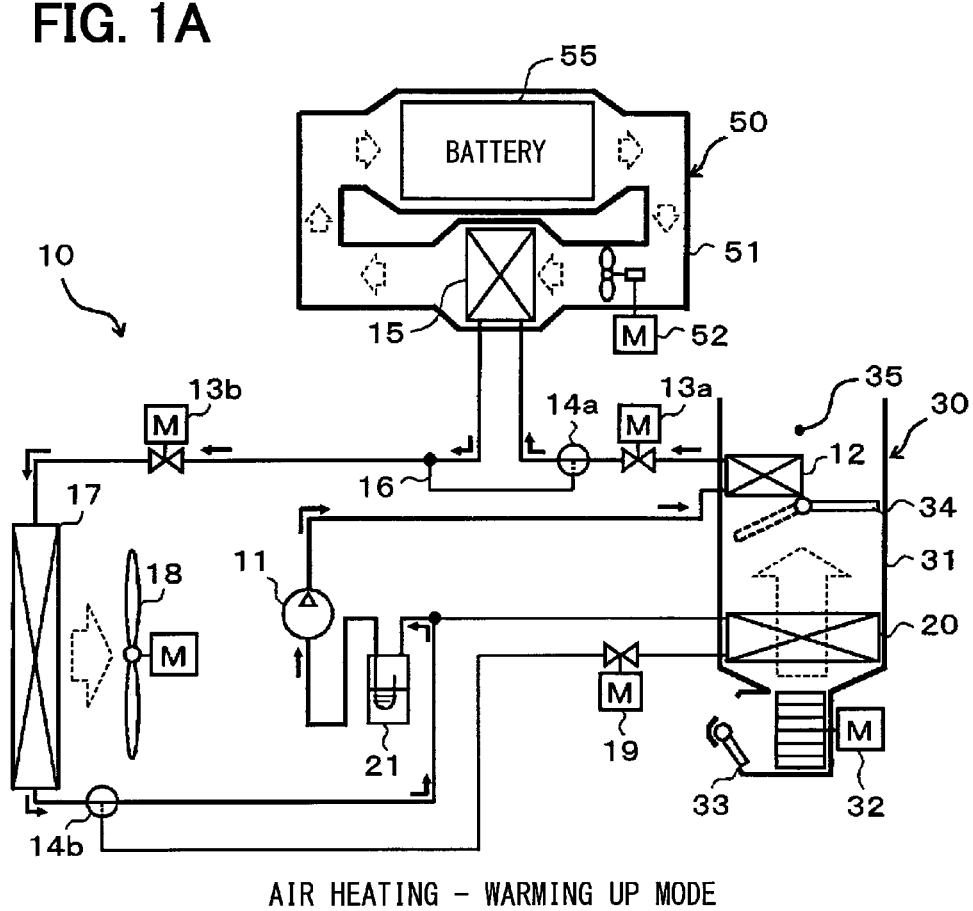
FIG. 1A is an exemplary diagram showing a refrigerant flow in an air heating-warming up mode of a refrigeration cycle device according to a first embodiment.

A first embodiment of the present disclosure will be described below with reference to FIGS. 1A to 9. In this embodiment, a refrigeration cycle device 10 is applied to an electric vehicle that is designed to obtain a driving force for traveling from a traveling electric motor. Further, in the electric vehicle, the refrigeration cycle device 10 can be used to control air conditioning (air cooling and heating) of a vehicle interior, and also to adjust the temperature (warming-up) of a battery 55 which serves as an electric storage device for storing therein electric power to be supplied to the traveling electric motor.

Thus, the refrigeration cycle device 10 performs a function of adjusting the temperature of air for a vehicle interior to be blown into a vehicle compartment as a space to be air conditioned, and another function of heating air for the battery to be blown toward the battery 55. In other words, the refrigeration cycle device 10 can adjust the temperatures of a plurality of temperature adjustment objects (fluids to be temperature adjustment), specifically, the air for the interior and the air for the battery.

More specifically, the refrigeration cycle device 10 can switch between an air heating mode for heating the vehicle interior by heating the air for the interior and an air cooling mode for cooling the vehicle interior by cooling the air for the interior as an operation mode for air conditioning. In the description below, the operation mode of adjusting the temperature (warming-up) of the battery 55 is referred to as a "warming up mode", and the operation mode of not adjusting the temperature of the battery 55 is referred to as a "non-temperature adjustment mode".

The battery 55 of this embodiment is a secondary battery that can repeatedly discharge electric power by being charged, specifically, adopts a lithium-ion battery. Note that output characteristics of the battery 55 will be described later.

First, the detailed structure of the refrigeration cycle device 10 will be described below. A compressor 11 is positioned in a bonnet of the vehicle, and is to suck, compress, and discharge the refrigerant in the refrigeration cycle device 10. The compressor is an electric compressor which rotates and drives a fixed displacement compressor with its discharge capacity fixed by use of an electric motor. The electric motor of the compressor 11 has its operation (the number of revolutions) controlled by a control signal output from a controller 100 to be described later.

The refrigeration cycle 10 employs a hydrofluorocarbon (HFC) refrigerant (for example, R134a) as the refrigerant, and forms a subcritical refrigeration cycle whose high-pressure side refrigerant pressure does not exceed the critical pressure of the refrigerant. Obviously, a hydrofluoro-olefin (HFO) refrigerant (for example, R1234yf) may be used as the refrigerant. Refrigerating machine oil for lubricating the compressor 11 is mixed into the refrigerant, and a part of the refrigerating machine oil circulates through the cycle together with the refrigerant.

The discharge port side of the compressor 11 is coupled to a refrigerant inlet side of an interior condenser 12. The interior condenser 12 is disposed in a casing 31 for forming an air passage for interior air in an interior air conditioning unit 30 to be described later. The interior condenser 12 is an air heat exchanger for heating the air for the interior by exchanging heat between high-pressure refrigerant discharged from the compressor 11 and the air for the interior having passed through an interior evaporator 20 to be described later.

That is, the interior condenser 12 constitutes a heat exchanger for heating the air for the interior using the refrigerant discharged from the compressor 11 as a heat source. The details of the interior air conditioning unit 30 will be described later.

A refrigerant outlet side of the interior condenser 12 is coupled to an inlet side of a high-stage side expansion valve 13a serving as a high-stage side decompressor for decompressing the refrigerant flowing from the interior condenser 12. The high-stage side expansion valve 13a is an electric variable throttle valve including a valve body whose opening degree is adjustable, and an electric actuator with a stepping motor for changing the opening degree of the valve body. The high-stage side expansion valve 13a has its operation controlled by a control signal output from the controller 100.

The high-stage side expansion valve 13a is the variable throttle with a fully opening function that serves as a single refrigerant passage by fully opening its opening degree without exhibiting any refrigerant decompressing effect. An outlet side of the high-stage side expansion valve 13a is coupled to a first three-way valve 14a. The three-way valve 14a is an electric three-way valve whose operation is controlled by a control voltage output from the controller 100.

Specifically, the first three-way valve 14a is adapted to switch between a refrigerant circuit for connecting the outlet side of the high-stage side expansion valve 13a to the refrigerant inlet side of the heat exchanger 15 for the battery, and another refrigerant circuit for connecting the outlet side of the high-stage side expansion valve 13a to the inlet side of a bypass passage 16.

Thus, the first three-way valve 14a serves as a refrigerant flow path switch for switching between the refrigerant circuits for allowing the refrigerant to circulate through the cycle.

A heat exchanger 15 for the battery is disposed in a battery pack 50 that forms an air passage through which air for the battery is blown toward the battery 55. The heat exchanger 15 for the battery is a heat exchanger to adjust the temperature of the air for the battery by exchanging heat between the refrigerant flowing therethrough and the air for the battery. In this embodiment, in the warming-up mode, the air for the battery is heated by exchanging heat between the refrigerant decompressed by the high-stage side expansion valve 13a and the air for the battery, thereby indirectly heating the battery 55.

That is, the heat exchanger 15 for the battery serves to heat the battery 55 via the air for the battery as the heat medium, using the refrigerant decompressed by the high-stage side expansion valve 13a in the warming up mode. The details of the battery pack 50 will be described later. The refrigerant outlet side of the heat exchanger 15 for the battery is coupled to the inlet side of a low-stage side expansion valve 13b.

The bypass passage 16 is a refrigerant passage that allows the refrigerant flowing from the high-stage side expansion valve 13a to be guided to the inlet side of the low-stage side expansion valve 13b while bypassing the heat exchanger 15 for the battery. The low-stage side expansion valve 13b is a low-stage side decompressor for decompressing the refrigerant flowing from the heat exchanger 15 for the battery. The low-stage side expansion valve 13b has the same basic structure as that of the high-stage side expansion valve 13a. Therefore, the low-stage side expansion valve 13b is configured of a variable throttle with the fully opening function.

The outlet side of the low-stage side expansion valve 13 is coupled to the refrigerant inlet side of an exterior heat exchanger 17. The exterior heat exchanger 17 is disposed in the bonnet of the vehicle, and serves to exchange heat between the refrigerant flowing therethrough and outside air blown from a blower fan 18. More specifically, the exterior heat exchanger 17 of this embodiment serves as an evaporator for evaporating a low-pressure refrigerant at least in the air heating mode, and also serves as a radiator for dissipating heat from a high-pressure refrigerant at least in the air cooling mode.

A blower fan 18 is an electric blower whose operating ratio, that is, whose number of revolutions (volume of air to be blown) is controlled by a control voltage output from the controller 100. A refrigerant outlet side of the exterior heat exchanger 17 is coupled to a second three-way valve 14b. The second three-way valve 14b has the same basic structure as that of the first three-way valve 14a. Thus, the second three-way valve 14b is an electric three-way valve whose operation is controlled by a control voltage output from the controller 100.

Specifically, the second three-way valve 14b switches between a refrigerant circuit for connecting the refrigerant outlet side of the exterior heat exchanger 17 to an inlet side of an accumulator 21 disposed on the suction side of the compressor 11, and another refrigerant circuit for connecting the refrigerant outlet side of the exterior heat exchanger 17 to an inlet side of an expansion valve 19 for air cooling. Thus, the second three-way valve 14b constitutes the refrigerant circuit switch together with the first three-way valve 14a described above.

The expansion valve 19 for air cooling is an electric expansion valve that has the same structure as that of each of the high-stage side expansion valve 13a and the low-stage side expansion valve 13b. The expansion valve 19 for air cooling is a decompressor for decompressing the refrigerant flowing from the exterior heat exchanger 17 into the interior evaporator 20 in the air cooling mode. Further, the expansion valve 19 for air cooling has a complete closing function of closing a refrigerant passage leading from the second three-way valve 14b to the interior evaporator 20 by completely closing its opening degree.

The interior evaporator 20 is disposed on the upstream side of air flow with respect to the above interior condenser 12 within the casing 31 of the interior air conditioning unit 30. The interior evaporator 20 is a heat exchanger for cooling the air for the interior by exchanging heat between the air for the interior and the low-pressure refrigerant decompressed by the expansion valve 19 for air cooling to evaporate the refrigerant in the air cooling mode.

The refrigerant outlet side of the interior evaporator 20 is coupled to the inlet side of the accumulator 21. The accumulator 21 is a gas-liquid separator that separates the refrigerant flowing thereinto into liquid and gas phases, and which stores therein the excessive refrigerant within the cycle. A gas-phase refrigerant outlet of the accumulator 21 is coupled to a suction side of the compressor 11. Thus, the accumulator 21 serves to suppress the suction of the liquid-phase refrigerant into the compressor 11 to thereby prevent the compression of the liquid in the compressor 11.

Now, the interior air conditioning unit 30 will be described below. The interior air conditioning unit 30 is to blow out the air for the interior whose temperature is adjusted, into the vehicle compartment. The interior air conditioning unit 30 is disposed inside a gauge board (instrument panel) at the forefront of the vehicle compartment. The unit 30 accommodates a blower 32, the above-mentioned interior condenser 12, the interior evaporator 20, an air mix door 34, and the like in the casing 31 forming an outer envelope.

The casing 31 forms therein an air passage dedicated for the air for interior. The casing 31 is formed of resin (for example, polypropylene) having some degree of elasticity and excellent strength. An inside/outside air switch 33 for switching between the air (inside air) in the vehicle interior and the outside air to introduce the selected air thereinto is disposed on the most upstream side of the flow of the air for the interior in the casing 31.

The inside/outside air switch 33 has an inside air introduction port for introducing inside air into the casing 31, and an outside air introduction port for introducing outside air into the casing 31. An inside/outside air switching door is positioned inside the inside/outside air switch 33 to continuously adjust the opening areas of the inside air introduction port and the outside air introduction port to thereby change the ratio of the volume of the inside air to that of the outside air.

On the downstream side of air flow of the inside/outside air switch 33, the blower 32 is provided for blowing air introduced via the inside/outside air switch 33 toward the vehicle interior. The blower 32 is an electric blower that drives a centrifugal multi-blade fan (sirocco fan) by an electric motor. The blower 32 has the number of revolutions (i.e., air blowing volume) controlled by a control voltage output from the controller 100.

The interior evaporator 20 and interior condenser 12 are disposed on the downstream side of the air flow from the blower 32 in that order with respect to the flow of the air for the interior. In short, the interior evaporator 20 is disposed on the upstream side in the flow direction of the air for the interior with respect to the interior condenser 12.

The air mix door 34 is disposed on the downstream side of the air flow in the interior evaporator 20 and on the upstream side of the air flow in the interior condenser 12. The air mix door 34 adjusts the rate of the volume of the air passing through the interior condenser 12 in the air having passed through the interior evaporator 20. A mixing space 35 is provided on the downstream side of the air flow in the interior condenser 12 so as to mix the air heated by exchanging heat with the refrigerant in the interior condenser 12, with the air not heated while bypassing the interior condenser 12.

Openings for blowing the air (conditioned air) mixed in the mixing space 35, into the vehicle interior as a space to be conditioned are disposed on the most downstream side of the air flow in the casing 31. Specifically, the openings include a face opening for blowing the conditioned air toward the upper body of a passenger in the vehicle compartment, a foot opening for blowing the conditioned air toward the foot of the passenger, and a defroster opening for blowing the conditioned air toward the inner side of a front windscreen of the vehicle (which openings are not shown).

A face air outlet, a foot air outlet, and a defroster air outlet (not shown) provided in the vehicle interior are connected to the downstream sides of the air flows from these face opening, foot opening, and defroster opening, respectively, via ducts forming respective air passages.

Thus, the air mix door 34 adjusts the rate of the volume of air passing through the interior condenser 12 to thereby adjust the temperature of conditioned air mixed in the mixing space 35, thus controlling the temperature of the conditioned air blown from each opening. That is, the air mix door 34 serves as a temperature adjustment unit for adjusting the temperature of the conditioned air to be blown into the vehicle interior.

Note that the air mix door 34 is driven by an electric actuator for driving an air mix door. The electric actuator for driving the air mix door has its operation controlled by the control signal output from the controller 100.

A face door for adjusting an opening area of the face opening is positioned on the upstream side of the air flow of the face opening; a foot door for adjusting an opening area of the foot opening is positioned on the upstream side of the air flow of the foot opening; and a defroster door for adjusting an opening area of the defroster opening is positioned on the upstream side of the air flow of the defroster opening (these doors being not shown).

The face door, foot door, and defroster door serve as air outlet mode switch for switching among air outlet modes. These doors are coupled to and rotated with the electric actuator for driving an air outlet mode door via a link mechanism or the like. The electric actuator for driving the air outlet mode door has its operation controlled by a control signal output from the controller 100.

The air outlet modes switched by the air outlet mode switch specifically include a face mode of blowing air from the face air outlet toward an upper half of the body of a passenger in the vehicle interior by fully opening the face air outlet; and a bi-level mode of blowing the air toward the upper half of the body and the foot of the passenger in the vehicle interior by opening both the face air outlet and foot air outlet. The air outlet modes also include a foot mode of blowing air mainly from the foot air outlet by fully opening the foot air outlet while opening the defroster air outlet only by a small opening degree; and a foot defroster mode of blowing air from both the foot air outlet and the defroster air outlet by opening the foot air outlet and the defroster air outlet to the same degree.

Next, the battery pack 50 will be described below. The battery pack 50 is disposed on a side of the bottom surface of the vehicle located between a luggage space and back seat on the rear side of the vehicle. The battery pack includes a metal casing 51 subjected to an electric-insulating treatment (for example, insulating coating), and forms an air passage for blowing the air for the battery into the casing 51, causing the air to circulate therethrough. The battery pack accommodates a blower 52, the above-mentioned heat exchanger 15 for the battery, the battery 55, and the like in the air passage.

The blower 52 is disposed on the upstream side of the air flow of the heat exchanger 15 for the battery. The blower 52 is an electric blower that is adapted to blow the air for the battery toward the heat exchanger 15 for the battery. The blower 52 has an operating rate, that is, the number of revolutions (air blowing volume) controlled by a control voltage output from the controller 100. Further, the battery 55 is disposed on the downstream side of the air flow in the heat exchanger 15 for the battery. The downstream side of the air flow of the battery 55 communicates with the suction port side of the blower 52.

Thus, once the blower 52 is operated, the air for the battery whose temperature is adjusted by the heat exchanger 15 for the battery is blown to the battery 55, thereby adjusting the temperature of the battery 55. Then, the air for the battery having adjusting the temperature of the battery 55 is sucked into the blower 52 to be blown again toward the heat exchanger 15 for the battery.

Next, an electric controller of this embodiment will be described below. The controller 100 is constructed of a known microcomputer, including CPU, ROM, RAM, and the like, and a peripheral circuit thereof. The controller controls the operations of various devices to be controlled 11, 13a, 13b, 14a, 14b, 18, 19, 32, 52, and the like which are connected to the output side by performing various kinds of computations and processing based on control programs stored in the ROM.

The input side of the controller 100 is connected to an inside air sensor for detecting a vehicle interior temperature (inside air temperature) Tr, an outside air sensor for detecting a vehicle exterior temperature (outside air temperature) Tam, and a solar radiation sensor for detecting an amount of solar radiation As applied to the vehicle interior. Further, the input side of the controller 100 is also connected to a high-pressure side refrigerant pressure sensor for detecting a refrigerant pressure (high-pressure side refrigerant pressure) Pd1 of the refrigerant on the outlet side of the interior condenser 12, and a high-pressure side refrigerant temperature sensor for detecting the refrigerant temperature (high-pressure side refrigerant temperature) Td1 of the refrigerant on the outlet side of the interior condenser 12. Moreover, the input side of the controller 100 is connected to an intermediate-pressure side refrigerant pressure sensor for detecting a refrigerant pressure (intermediate-pressure side refrigerant pressure) Pd2 of the refrigerant on the outlet side of the heat exchanger 15 for the battery, and an intermediate-pressure side refrigerant temperature sensor for detecting a refrigerant temperature (intermediate-pressure side refrigerant temperature) Td2 of the refrigerant on the outlet side of the heat exchanger 15 for the battery.

In addition to these sensors, a group of various sensors for control is connected to the input side of the controller 100. The various sensors include an evaporator temperature sensor for detecting a refrigerant evaporation temperature (evaporator temperature) Tefin in the interior evaporator 20, and an air temperature sensor for detecting an air temperature TAV of air to be blown from the mixing space into the vehicle interior. The sensors also include an exterior heat exchanger temperature sensor for detecting an exterior device temperature Ts of the exterior heat exchanger 17, an exterior heat exchanger pressure sensor for detecting a refrigerant pressure Ps of the refrigerant on the outlet side of the exterior heat exchanger 17, and a battery temperature sensor as a temperature detector for detecting a battery temperature Tb which is the temperature of the battery 55.

The evaporator temperature sensor of this embodiment is adapted to detect the temperature of a heat exchanging fin of the interior evaporator 20, but may adopt a temperature detector for detecting the temperature of another part of the interior evaporator 20. The exterior heat exchanger temperature sensor of this embodiment is adapted to detect the temperature of a refrigerant outflow port of the exterior heat exchanger 17, but may adopt a temperature detector for detecting the temperature of another part of the interior evaporator 20.

In this embodiment, the air temperature sensor for detecting the air temperature TAV is provided. As the air temperature TAV, a value calculated based on the evaporator temperature Tefin, the discharge refrigerant temperature Td, and the like may be used.

The general battery 55 has a large thermal capacity as compared to respective components of the refrigeration cycle device 10, and is more likely to have a temperature distribution. For this reason, this embodiment uses a plurality of temperature detectors to detect a plurality of points of the inside and surfaces of the battery 55, thereby constituting a battery temperature sensor, and then determines a battery temperature Tb by averaging detected values obtained from the temperature detectors.

An operation panel (not shown) is disposed near an instrument board at the front of the vehicle compartment, and coupled to the input side of the controller 100. Operation signals are input from various types of operation switches provided on the operation panel. Various operation switches provided on the operation panel include an air-conditioning operation switch for requesting air conditioning of the vehicle interior, a vehicle interior temperature setting switch as a target temperature setting portion for setting a target temperature Tset of the vehicle interior, a selection switch for the operation mode for air conditioning, and the like.

The controller 100 of this embodiment is integrally structured with a control unit for controlling various devices to be controlled connected to an output side of the controller. The control unit for controlling the operation of each of the devices to be controlled may include a structure (hardware and software) for controlling the operation of each of the devices to be controlled.

For example, in the controller 100, a structure (hardware and software) for controlling the operation (refrigerant discharge capacity) of the compressor 11 constitutes a discharge capacity controller, a structure for controlling the operation of the high-stage side expansion valve 13a constitutes a high-stage side opening degree controller, and a structure for controlling the operation of the low-stage side expansion valve 13b constitutes a low-stage side opening degree controller. Further, a structure for controlling the operations of the first and second three-way valves 14a and 14b and the like constitutes a refrigerant circuit switch controller, and a structure for controlling a blowing capacity of the blower 32 constitutes a blowing capacity controller.

Next, the operation of the refrigeration cycle device 10 with the above-mentioned structure in this embodiment will be described below. As mentioned above, in the refrigeration cycle device 10, the operation modes for air conditioning include an air heating mode and an air cooling mode, while the operation modes for warming-up of the battery 55 include a warming-up mode and a non-temperature adjustment mode.

Switching between these operation modes is performed by causing the controller 100 to execute a control program pre-stored in a storage circuit. The control program is executed to repeat a control routine. The control routine involves reading an operation signal from the operation panel and detection signals from a group of sensors for control, determining the control state of each of various devices to be controlled based on the detection signals and operation signal read, and outputting a control signal (control voltage) to each of the various devices to be controlled so as to obtain the determined control state.

Specifically, in the case of reading the operation signal from the operation panel in the operation mode for air conditioning, switching is performed to the air heating mode when heating is selected by the selection switch with an air-conditioning operation switch turned on (ON), whereas switching is performed to the air cooling mode when air cooling is selected by the selection switch with the air-conditioning operation switch turned on (ON).

In the case of reading the detection signal from the sensor group for control in the warming-up mode of warming up the battery 55, the operation in the warming-up mode is performed when the battery temperature Tb is equal to or less than the first reference temperature Tk1 (15° C. in this embodiment), whereas the operation in the warming up mode is stopped when the battery temperature Tb is equal to or higher than the second reference temperature Tk2 (30° C. in this embodiment). That is, switching is performed to the non-temperature adjustment mode.

Figure 9:
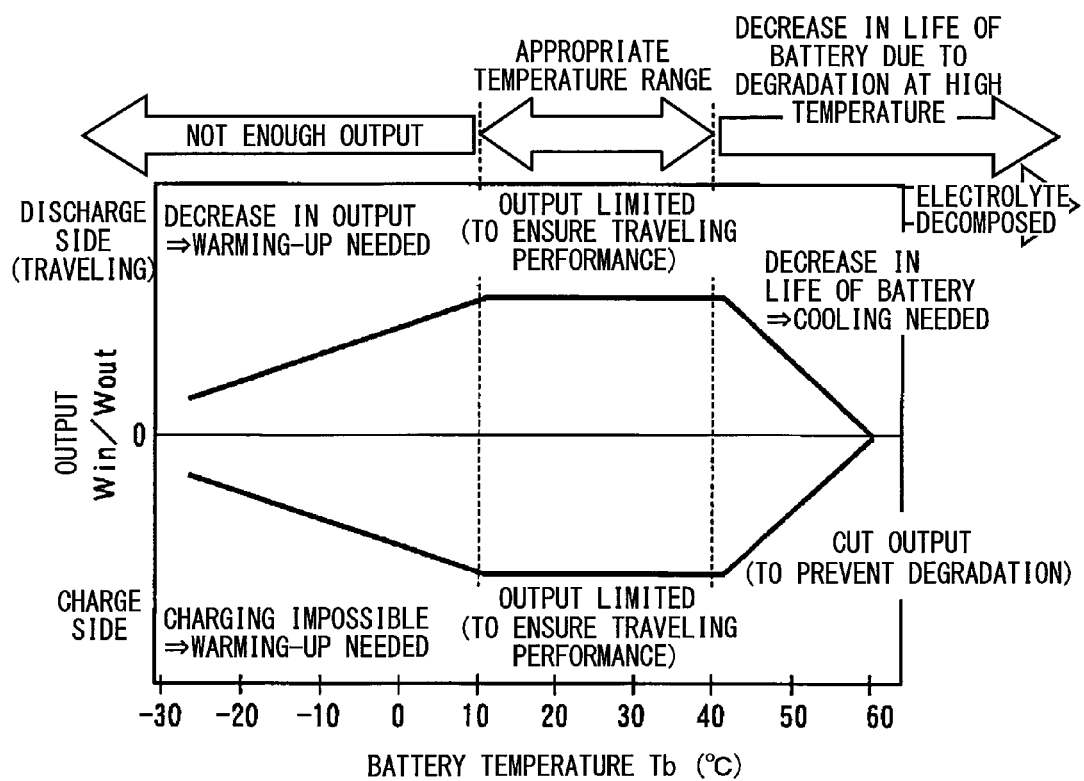
FIG. 9 is an explanatory diagram for explaining output characteristics of a battery (lithium-ion battery) in the first embodiment.

Here, the output characteristics of the battery 55 (lithium-ion battery) in this embodiment will be described using FIG. 9. As shown in FIG. 9, at low temperature of 10° C. or lower, the battery 55 of this embodiment cannot obtain sufficient input and output characteristics because a chemical reaction does not progress. That is, once the battery 55 becomes at 10° C. or lower, the output from the battery 55 is reduced, and thereby it does not permit the traveling of the vehicle.

On the other hand, at high temperature, specifically, in a range of 40° C. or higher, the electric power is controlled to switch between input and output so as to prevent the degradation of the battery 55. Thus, even when the battery 55 becomes at a high temperature of 40° C. or more, the vehicle cannot travel. That is, in order to travel the vehicle by sufficiently using the capacity of the battery 55 of this embodiment, it is necessary to manage the temperature of the battery 55 in a range of about 10 to 40° C.

In this embodiment, the temperature range (of 10 to 40° C.) that is determined to sufficiently use the capacity of the battery 55 is set as a reference temperature range. When the battery temperature Tb is equal to or less than the first reference temperature Tk1, the refrigeration cycle device is switched to the warming-up mode, whereas when the battery temperature Tb is equal to or more than the second reference temperature Tk2, the refrigeration cycle device is switched to the non-temperature adjustment mode. In this way, the battery temperature Tb is controlled within the reference temperature range.

Now, a description will be given of the operation in each of the operation modes.

The air heating-warming up mode is an operation mode in which the air heating mode and the warming-up mode are simultaneously performed. More specifically, this operation mode is performed with an operation switch of the operation panel turned on (ON) when heating is selected by the selection switch and the battery temperature Tb is equal to or lower than the first reference temperature Tk1.

In the air heating-warming up mode, the controller 100 completely closes the expansion valve 19 for air cooling while bringing the high-stage side expansion valve 13a and the low-stage side expansion valve 13b into a throttle state of exhibiting a decompression effect. Further, the controller 100 controls the operation of the first three-way valve 14a so as to establish a connection between the outlet side of the high-stage side expansion valve 13a and the refrigerant inlet side of the heat exchanger 15 for the battery, and also controls the operation of the second three-way valve 14b so as to establish a connection between the refrigerant outlet side of the exterior heat exchanger 17 and the inlet side of the accumulator 21.

In this way, in the air heating-warming up mode, the refrigeration cycle device 10 performs switching to the refrigerant circuit for allowing the refrigerant to flow therethrough as indicated by solid arrows of FIG. 1A.

With the above structure of the refrigerant flow path, the controller 100 calculates a target air temperature TAO which is a target temperature of air to be blown into the vehicle interior based on values of the detection signal and operation signal read, by use of the following mathematical formula F1:

in which $TAO = Kset \times Tset - Kr \times Tr - Kam \times Tam - Ks \times As + C$ (F1)

where Tset is a vehicle interior preset temperature set by the temperature setting switch, Tr is a vehicle interior temperature (inside air temperature) detected by the inside air sensor, Tam is an outside air temperature detected by the outside air sensor, and As is an amount of solar radiation detected by the solar radiation sensor. The Kset, Kr, Kam, and Ks are control gains, and C is a constant for correction.

Thus, in this embodiment, a control step of determining the target air temperature TAO in a control program to be executed by the controller 100 constitutes a target temperature determination portion 100a. Further, the controller 100 determines the operating state of each of various devices to be controlled that are connected to the output side of the controller 100, based on the calculated target air temperature TAO and the detection signal from the sensor group.

Figure 1B:
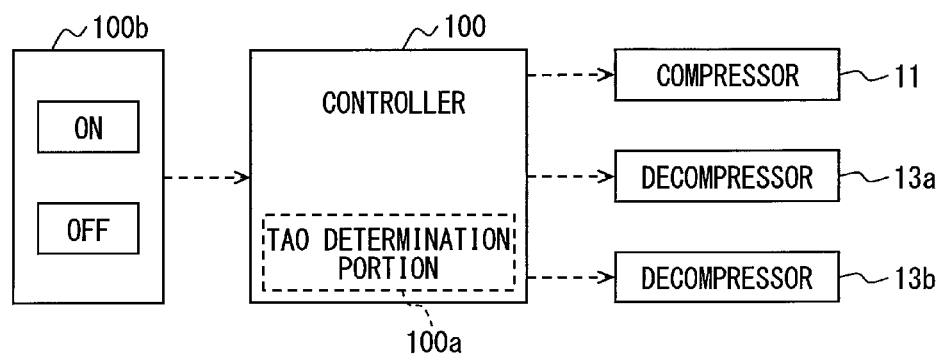
FIG. 1B is an exemplary diagram showing a part of a control system in a controller according to the first and second embodiments.

For example, as shown in FIG. 1B, a refrigerant discharge capacity of the compressor 11, that is, a control signal to be output to the electric motor of the compressor 11 is determined as follows. A target high pressure Pdt1 in the interior condenser 12 is determined based on the target air temperature TAO with reference to a control map previously stored in the controller 100. Then, the control signal to be output to the electric motor of the compressor 11 is determined such that a high-pressure side refrigerant pressure Pd1 detected by the high-pressure side refrigerant pressure sensor approaches the target high pressure Pdt1.

Note that the target high pressure Pdt1 is a value that is determined such that the air temperature TAV detected by the air temperature sensor approaches the target air temperature TAO. In other words, the refrigerant discharge capacity of the compressor 11 is controlled to cause the air temperature TAV to get close to the target air temperature TAO. The target air temperature TAO determined in heating the vehicle interior is in a range of approximately 40 to 60° C.

The opening degree of the high-stage side expansion valve 13a is determined such that an intermediate-pressure side refrigerant pressure Pd2 determined by an intermediate-pressure side refrigerant pressure sensor approaches a target intermediate pressure Pdt2. Note that the target intermediate pressure Pdt2 is a value that is determined such that the temperature of the battery 55 is within the above-mentioned reference temperature range (10 to 40° C.). In other words, the opening degree of the high-stage side expansion valve 13a is controlled to set the temperature of the battery 55 within the reference temperature range.

An opening degree of the low-stage side expansion valve 13b is determined as follows. Specifically, a subcooling degree of a refrigerant on the outlet side of the heat exchanger 15 for the battery is calculated based on the intermediate-pressure side refrigerant pressure Pd2 as well as an intermediate-pressure side refrigerant temperature Td2 detected by an intermediate-pressure side refrigerant temperature sensor. A target subcooling degree KSC is determined such that a coefficient of performance (COP) of the cycle is substantially maximized. Thus, the opening degree of the low-stage side expansion valve 13b is determined such that the subcooling degree of the refrigerant on the outlet side of the heat exchanger 15 for the battery approaches the target subcooling degree KSC (5K to 15K in this embodiment).

The control voltage to be output to the electric motor of the blower 32 is determined based on the target air temperature TAO with reference to a control map pre-stored in the storage circuit. Specifically, in an ultra-low temperature range (maximum air cooling range) and ultra-high temperature range (maximum heating range) of the target air temperature TAO, the control voltage to be output to the electric motor is maximized to thereby control the volume of blown air to be close to the maximum level. As the target air temperature TAO is increased closer to an intermediate temperature range, the volume of the air is decreased.

The control signal to be output to the electric actuator of the air mix door 34 is determined such that the air mix door 34 fully opens the air passage on a side of the interior condenser 12. The control signal to be output to the blower 52 of the battery pack 50 is determined such that a blowing capacity of the blower 52 is a predetermined blowing capacity. Then, the control signals (control voltages) are output from the controller 100 to the devices to be controlled so as to obtain the control state determined above.

Thus, the refrigeration cycle device 10 in the air heating-warming up mode changes the state of the refrigerant as illustrated in a Mollier chart of FIG. 5. That is, the high-pressure refrigerant discharged from the compressor 11 flows into the interior condenser 12, and exchanges heat with the air for the interior to dissipate heat therefrom (as indicated from the point a1 to point a2 in FIG. 5). In this way, the air for the interior is heated, thereby achieving the air heating of the vehicle interior. At this time, the refrigerant pressure (corresponding to the high-pressure side refrigerant pressure Pd1) within the interior condenser 12 is adjusted to such a value that allows the air temperature TAV to heat the vehicle interior as mentioned above.

The refrigerant flowing from the interior condenser 12 is decompressed by the high-stage side expansion valve 13a into an intermediate pressure (as indicated from the point a2 to a point a3 in FIG. 5). The refrigerant decompressed by the high-stage side expansion valve 13a flows into the heat exchanger 15 for the battery via the first three-way valve 14a. The refrigerant flowing into the heat exchanger 15 for the battery exchanges heat with the air for the battery to dissipate heat therefrom (as indicated from the point a3 to a point a4 in FIG. 5).

In this way, the air for the battery is heated. The heated air for the battery is blown to the battery 55 by the blower 52, thereby warming up the battery 55. At this time, the refrigerant pressure (corresponding to the intermediate-pressure side refrigerant pressure Pd2) within the heat exchanger 15 for the battery is adjusted to such a pressure that sets the battery temperature Tb within the reference temperature range.

The refrigerant flowing from the heat exchanger 15 for the battery is decompressed by the low-stage side expansion valve 13b into a low pressure (as indicated from the point a4 to a point a5 in FIG. 5). At this time, the subcooling degree of the refrigerant on the outlet side of the heat exchanger 15 for the battery (as indicated at the point a4 in FIG. 5) is adjusted to approach a target subcooling degree KSC. In this way, the refrigeration cycle device 10 can achieve the high COP.

The low-pressure refrigerant decompressed by the low-stage side expansion valve 13b flows into the exterior heat exchanger 17 to absorb heat from the outside air blown from the blower fan 18 to be evaporated itself (as indicated from the point a5 to a point a6 in FIG. 5). The refrigerant having flowed out of the exterior heat exchanger 17 flows into the accumulator 21 via the second three-way valve 14b. The gas-phase refrigerant separated by the accumulator 21 is sucked into the compressor 11 and compressed therein again.

Thus, in the air heating-warming up mode, the air for the interior can be heated by the interior condenser 12 to thereby heat the vehicle interior, while the air for the battery can be heated by the heat exchanger 15 for the battery to thereby warm up the battery 55.

The air heating-non-temperature adjustment mode is an operation mode in which the air conditioning of the vehicle interior in the air heating mode is performed without heating (warming-up) the battery 55. More specifically, this operation mode is performed with an operation switch of the operation panel turned on (ON) when heating is selected by the selection switch and the battery temperature Tb is higher than the second reference temperature Tk2.

In the air heating-non-temperature adjustment mode, the controller 100 brings the high-stage side expansion valve 13a into a throttle state, fully opens the low-stage side expansion valve 13b, and completely closes the expansion valve 19 for air cooling. Further, the operation of the first three-way valve 14a is controlled so as to establish a connection between the outlet side of the high-stage side expansion valve 13a and the inlet side of a bypass passage 16, and the operation of the second three-way valve 14b is also controlled so as to establish a connection between the refrigerant outlet side of the exterior heat exchanger 17 and the inlet side of the accumulator 21.

Figure 2:
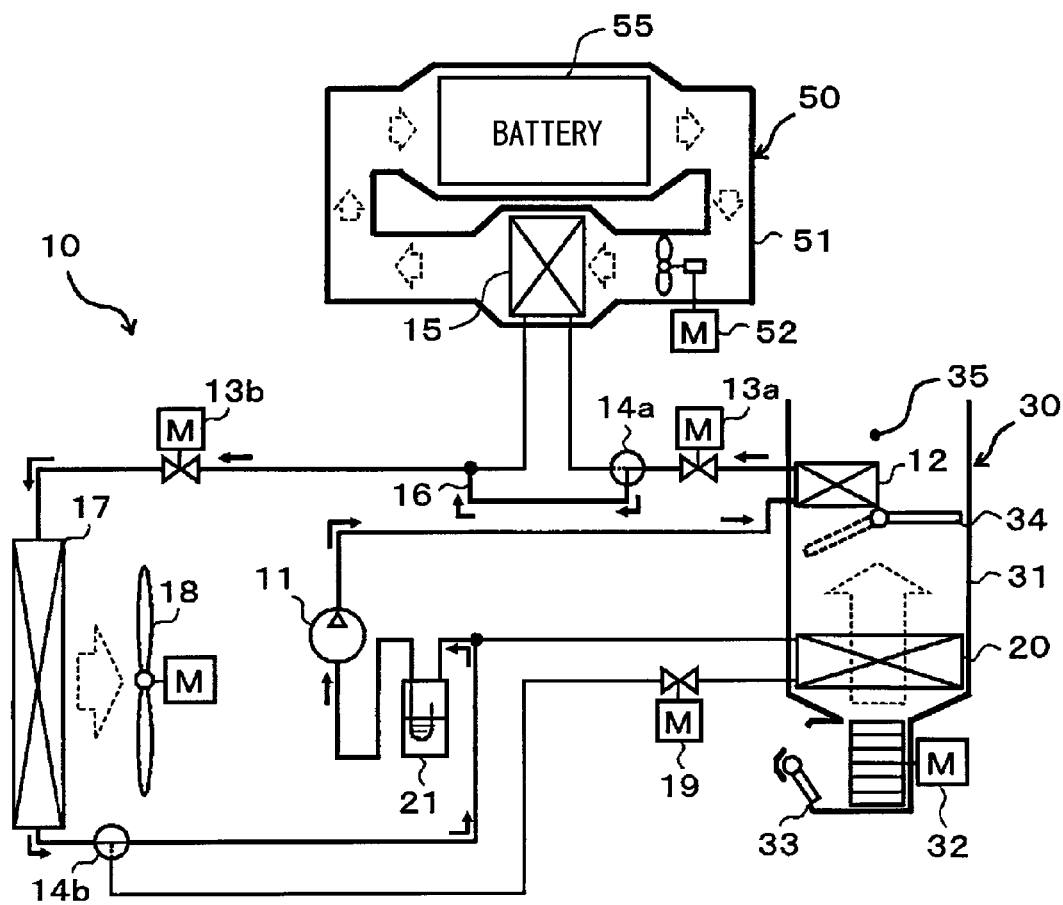
FIG. 2 is an exemplary diagram showing a refrigerant flow in an air heating-non-temperature adjustment mode of the refrigeration cycle device in the first embodiment.

In this way, in the air heating-non-temperature adjustment mode, the refrigeration cycle device 10 performs switching to the refrigerant circuit for allowing the refrigerant to flow therethrough as indicated by solid arrows of FIG. 2. With the structure of the refrigerant flow path, like the air heating-warming up mode, the controller 100 calculates the target air temperature TAO, and determines the operating states of various devices to be controlled based on the calculated target air temperature TAO and the detection signal from the sensor group.

For example, an opening degree of the high-stage side expansion valve 13a is determined as follows. Specifically, a subcooling degree of the refrigerant on the outlet side of the interior condenser 12 is calculated based on the high-pressure side refrigerant pressure Pd1 detected by the high-pressure side refrigerant pressure sensor as well as the high-pressure side refrigerant temperature Td1 detected by the high-pressure side refrigerant temperature sensor. The opening degree of the high-stage side expansion valve 13a is determined such that the obtained subcooling degree of the refrigerant on the outlet side of the interior condenser 12 approaches the target subcooling degree KSC. Thus, the refrigerant decompressed by the high-stage side expansion valve 13a becomes a low-pressure refrigerant whose saturated temperature is lower than the outside air temperature.

As can be seen from FIG. 2, the outlet side of the bypass passage 16 of the refrigeration cycle device 10 in this embodiment communicates with the heat exchanger 15 for the battery, so that the refrigerant pressure in the heat exchanger 15 for the battery is equal to that of the low-pressure refrigerant in the air heating-non-temperature adjustment mode. That is, in the air heating-non-temperature adjustment mode, the opening degree of the high-stage side expansion valve 13a is controlled such that the saturated temperature of the refrigerant in the heat exchanger 15 for the battery is lower than the outside air temperature. The control operations of other devices to be controlled are the same as those in the air heating-warming up mode.

Thus, the refrigeration cycle device 10 in the air heating-non-temperature adjustment mode changes the state of the refrigerant as illustrated in a Mollier chart of FIG. 6. That is, the high-pressure refrigerant discharged from the compressor 11 flows into the interior condenser 12, and exchanges heat with the air for the interior to dissipate heat therefrom, like the air heating-warming up mode (as indicated from a point b1 to a point b2 in FIG. 6). In this way, the air for the interior is heated, thereby achieving the heating of the vehicle interior.

The refrigerant flowing from the interior condenser 12 is decompressed by the high-stage side expansion valve 13a into a low pressure (as indicated from the point b2 to a point b5 in FIG. 6). At this time, the subcooling degree of the refrigerant on the outlet side of the interior condenser 12 (as indicated at the point b2 in FIG. 6) is adjusted to approach the target subcooling degree KSC. In this way, the refrigeration cycle device 10 can achieve the high COP.

The low-pressure refrigerant decompressed by the high-stage side expansion valve 13a flows through the first three-way valve 14a, the bypass passage 16, the low-stage side expansion valve 13b, and the exterior heat exchanger 17 in that order. In the air heating-non-temperature adjustment mode, the low-stage side expansion valve 13b is fully opened, so that the refrigerant having flowed into the low-stage side expansion valve 13b flows into the exterior heat exchanger 17 without being decompressed.

The refrigerant having flowed into the exterior heat exchanger 17 absorbs heat from the outside air blown from the blower fan 18 to be evaporated itself (as indicated from the point b5 to a point b6 in FIG. 6). The operations following this step will be the same as those in the air heating-warming up mode.

Thus, in the air heating-non-temperature adjustment mode, the air for the interior can be heated by the interior condenser 12 to thereby heat the vehicle interior. The air for the battery is not heated by the heat exchanger 15 for the battery, and the warming up of the battery 55 is not performed.

The air cooling-warming up mode is an operation mode in which the air cooling mode and the warming up mode are simultaneously performed. More specifically, this operation mode is performed with an operation switch of the operation panel turned on (ON) when air cooling is selected by the selection switch and the battery temperature Tb is equal to or lower than the first reference temperature Tk1.

Since the air cooling of the vehicle interior is performed when the outside air temperature is relatively high in summer, there are few opportunities that cause the battery 55 to be at the first reference temperature Tk1 or lower. Therefore, the operation in the air cooling-warming up mode is less likely to be performed.

In the air cooling-warming up mode, the controller 100 fully opens the low-stage side expansion valve 13b while bringing the high-stage side expansion valve 13a and the expansion valve 19 for air cooling into the throttle state. Further, the controller 100 controls the operation of the first three-way valve 14a so as to establish a connection between the outlet side of the high-stage side expansion valve 13a and the refrigerant inlet side of the heat exchanger 15 for the battery, and also controls the operation of the second three-way valve 14b so as to establish a connection between the refrigerant outlet side of the exterior heat exchanger 17 and the inlet side of the expansion valve 19 for air cooling.

Figure 3:
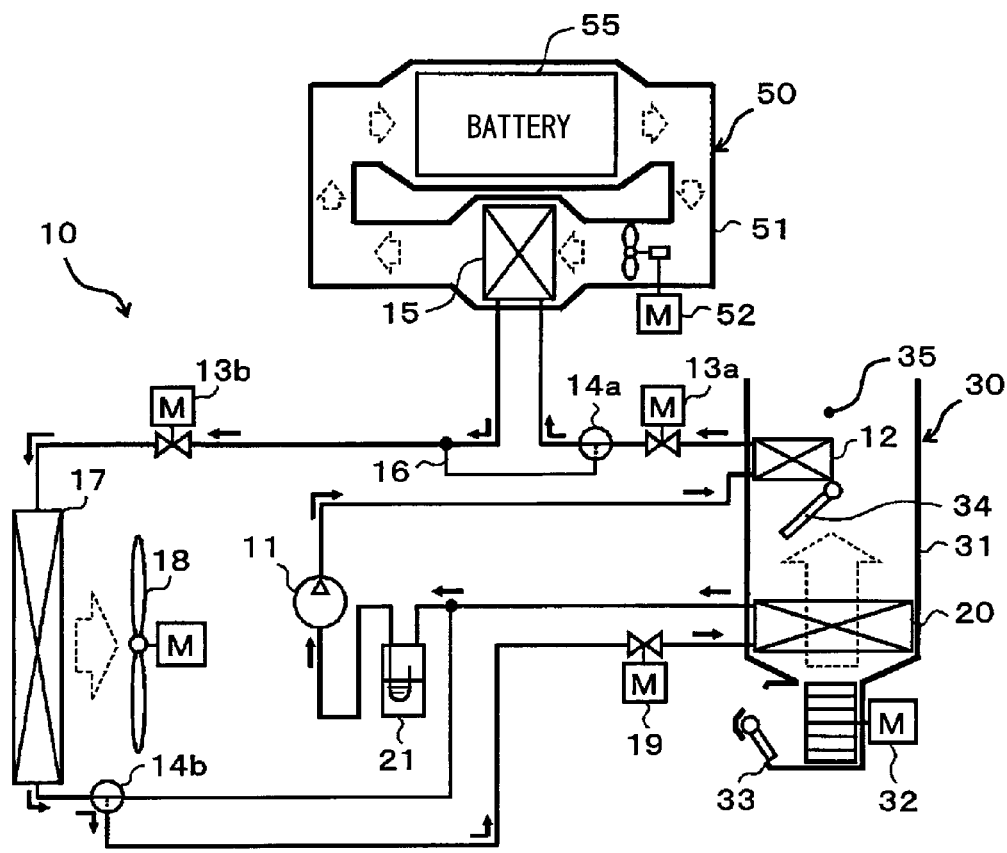
FIG. 3 is an exemplary diagram showing a refrigerant flow in an air cooling-warming up mode of the refrigeration cycle device in the first embodiment.

In this way, in the air cooling-warming up mode, the refrigeration cycle device 10 performs switching to the refrigerant circuit for allowing the refrigerant to flow therethrough as indicated by solid arrows of FIG. 3. With the structure of the refrigerant flow path, like the air heating-warming up mode, the controller 100 calculates the target air temperature TAO, and determines the operating states of various devices to be controlled, based on the calculated target air temperature TAO and the detection signal from the sensor group.

For example, the refrigerant discharge capacity of the compressor 11, that is, the control signal to be output to the electric motor of the compressor 11 are determined in the following way. First, a target evaporator air temperature TEO of the interior evaporator 20 is determined based on the target air temperature TAO with reference to the control map pre-stored in the controller 100.

Then, a control signal to be output to the electric motor of the compressor 11 is determined based on a deviation between the target evaporator air temperature TEO and the evaporator temperature Tefin detected by the evaporator temperature sensor such that the temperature of the air blown from the interior evaporator 20 approaches the target evaporator air temperature TEO by the feedback control.

An opening degree of the expansion valve 19 for air cooling is determined as follows. Specifically, a subcooling degree of the refrigerant on the outlet side of the exterior condenser 17 is calculated based on an exterior device temperature Ts detected by the exterior heat exchanger temperature sensor as well as a refrigerant pressure Ps on the outlet side of the exterior heat exchanger 17 detected by the exterior heat exchanger pressure sensor. The opening degree of the expansion valve 19 is determined such that the obtained subcooling degree of the refrigerant on the outlet side of the exterior heat exchanger 17 approaches the target subcooling degree KSC.

The control signal to be output to a servo motor of the air mix door 34 is determined such that the air temperature TAV approaches the target air temperature TAO. In an operation mode for cooling the vehicle interior, like the air cooling-warming up mode, the air mix door 34 may be operated so as to close the air passage on a side of the interior condenser 12. The control operations of various other devices to be controlled are the same as those in the air heating-warming up mode.

Figure 7:
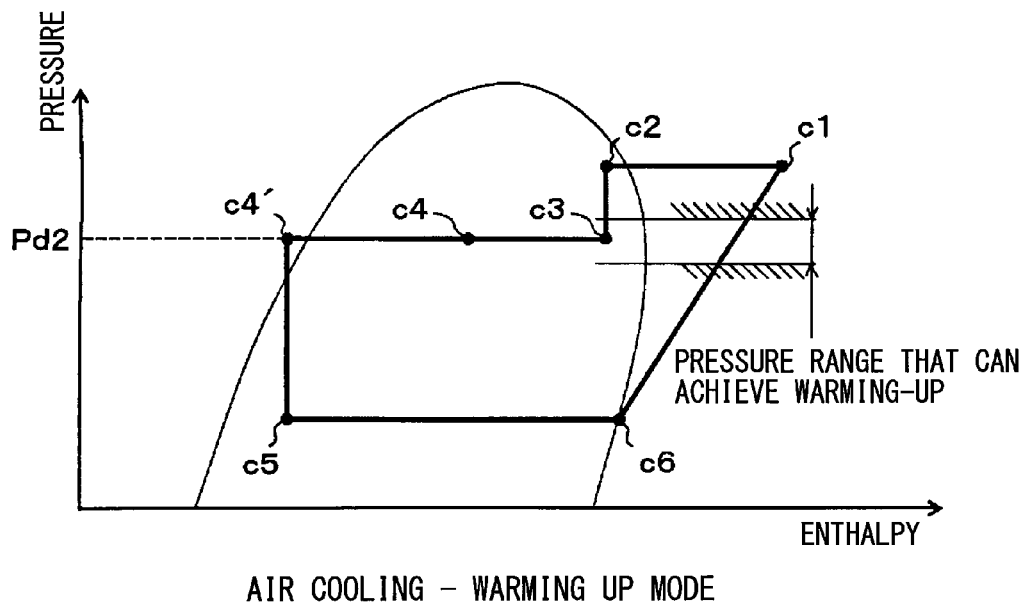
FIG. 7 is a Mollier chart showing the state of refrigerant in the air cooling-warming up mode of the refrigeration cycle device in the first embodiment.

Thus, the refrigeration cycle device 10 in the air cooling-warming up mode changes the state of the refrigerant as illustrated in a Mollier chart of FIG. 7. That is, the high-pressure refrigerant discharged from the compressor 11 flows into the interior condenser 12, and exchanges heat with the air for the interior to dissipate heat therefrom (as indicated from a point c1 to a point c2 in FIG. 7). In this way, part of the air for the interior is heated.

The refrigerant having flowed from the interior condenser 12 is decompressed into the intermediate pressure by the high-stage side expansion valve 13a like the air heating-warming up mode (as indicated from the point c2 to a point c3 in FIG. 7), and then flows into the heat exchanger 15 for the battery. The refrigerant flowing into the heat exchanger 15 for the battery exchanges heat with the air for the battery to dissipate heat therefrom (as indicated from the point c3 to a point c4 in FIG. 7). In this way, the air for the battery is heated, thereby achieving the warming-up of the battery 55.

Since the low-stage side expansion valve 13b is fully opened, the refrigerant having flowed from the heat exchanger 15 for the battery flows into the exterior heat exchanger 17 without being decompressed by the low-stage side expansion valve 13b. The refrigerant having flowed into the exterior heat exchanger 17 exchanges heat with outside air blown from the blower fan 18 to dissipate heat therefrom, thereby decreasing its enthalpy (as indicated from the point c4 to a point c4' in FIG. 7).

The refrigerant flowing from the exterior heat exchanger 17 flows into the expansion valve 19 for air cooling via the second three-way valve 14b, and is decompressed by the expansion valve 19 for air cooling into a low-pressure refrigerant (as indicated from the point c4' to a point c5 in FIG. 7). At this time, the subcooling degree of the refrigerant on the outlet side of the exterior heat exchanger 17 (as indicated at the point c4' in FIG. 7) is adjusted to approach the target subcooling degree KSC. In this way, the refrigeration cycle device 10 can achieve the high COP.

The low-pressure refrigerant decompressed by the expansion valve 19 for air cooling flows into the interior evaporator 20, and absorbs heat from the air for the interior blown from the blower 32 to evaporate itself (from the point c5 to a point c6 in FIG. 7). In this way, the air for the interior is cooled. Then, a part of the air for the interior cooled by the interior evaporator 20 is heated again by the interior condenser 12, whereby the air for the interior is adjusted to be at the target air temperature TAO to thereby achieve the air cooling of the vehicle interior.

The refrigerant having flowed from the interior evaporator 20 flows into the accumulator 21. The gas-phase refrigerant separated by the accumulator 21 is sucked into the compressor 11 and compressed therein again.

Thus, in the air cooling-warming up mode, the air for the interior can be cooled by the interior evaporator 20 to thereby cool the vehicle interior, while the air for the battery can be heated by the heat exchanger 15 for the battery to thereby warm-up the battery 55.

The air cooling-non-temperature adjustment mode is an operation mode in which the air conditioning of the vehicle interior in the air cooling mode is performed without heating (warming-up) the battery 55. More specifically, this operation mode is performed with an operation switch of the operation panel turned on (ON) when air cooling is selected by the selection switch and the battery temperature Tb is higher than the second reference temperature Tk2.

In the air cooling-non-temperature adjustment mode, the controller 100 fully opens the high-stage side expansion valve 13a and the low-stage side expansion valve 13b while bringing the expansion valve 19 for air cooling into the throttle state. Further, the operation of the first three-way valve 14a is controlled so as to establish a connection between the outlet side of the high-stage side expansion valve 13a and the inlet side of the bypass passage 16, and the operation of the second three-way valve 14b is also controlled so as to establish a connection between the refrigerant outlet side of the exterior heat exchanger 17 and the inlet side of the expansion valve 19 for air cooling.

Figure 4:
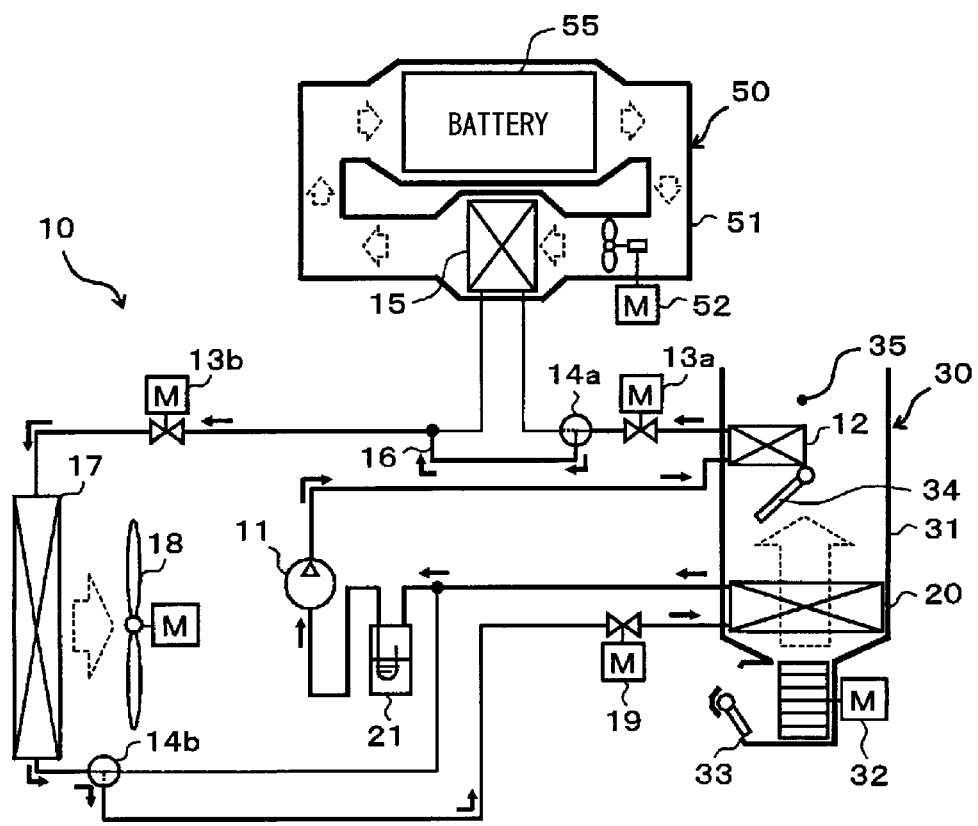
FIG. 4 is an exemplary diagram showing a refrigerant flow in an air cooling-non-temperature adjustment mode of the refrigeration cycle device in the first embodiment.

In this way, in the air cooling-non-temperature adjustment mode, the refrigeration cycle device 10 performs switching to the refrigerant circuit for allowing the refrigerant to flow therethrough as indicated by solid arrows of FIG. 4. With the structure of the refrigerant flow path, like the air cooling-warming up mode, the controller 100 calculates the target air temperature TAO, and determines the operating states of various devices to be controlled, based on the calculated target air temperature TAO and the detection signal from the sensor group.

Figure 8:
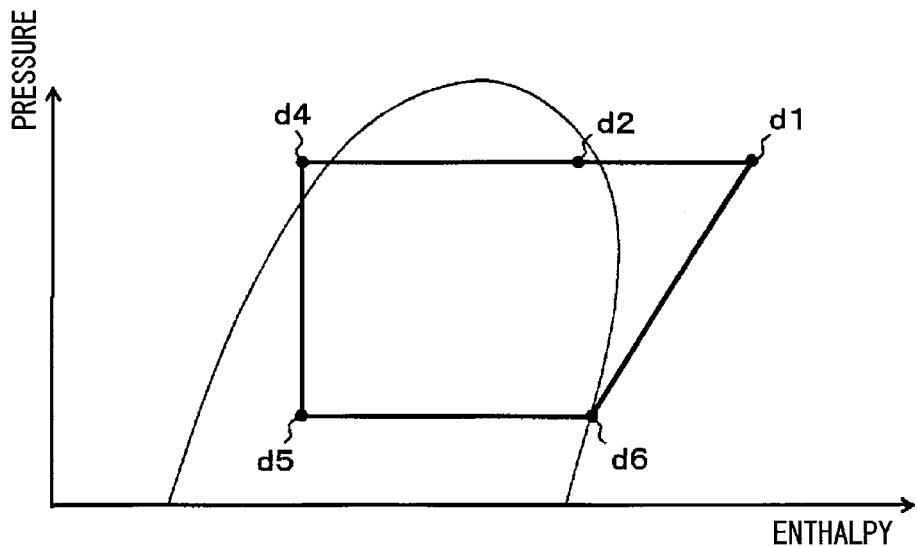
FIG. 8 is a Mollier chart showing the state of refrigerant in the air cooling-non-temperature adjustment mode of the refrigeration cycle device in the first embodiment.

Thus, the refrigeration cycle device 10 in the air cooling-non-temperature adjustment mode changes the state of the refrigerant as illustrated in a Mollier chart of FIG. 8. That is, the high-pressure refrigerant discharged from the compressor 11 flows into the interior condenser 12, and exchanges heat with the air for the interior to dissipate heat therefrom, like the air cooling-warming up mode (as indicated from a point d1 to a point d2 in FIG. 8). In this way, part of the air for the interior is heated.

The refrigerant having flowed from the interior condenser 12 flows through the high-stage side expansion valve 13a, the first three-way valve 14a, the bypass passage 16, and the low-stage side expansion valve 13b in that order to flow into the exterior heat exchanger 17. In the air cooling-non-temperature adjustment mode, the high-stage side expansion valve 13a and the low-stage side expansion valve 13b are fully opened, so that the refrigerant having flowed from the interior condenser 12 flows into the exterior heat exchanger 17 without being decompressed by the high-stage side expansion valve 13a and the low-stage side expansion valve 13b.

The refrigerant having flowed into the exterior heat exchanger 17 exchanges heat with outside air blown from the blower fan 18 to dissipate heat therefrom, thereby decreasing its enthalpy (as indicated from the point d2 to a point d4 in FIG. 8). The refrigerant flowing from the exterior heat exchanger 17 flows into the expansion valve 19 for air cooling via the second three-way valve 14b, and is decompressed by the expansion valve 19 for air cooling into a low pressure (as indicated from the point d4 to a point d5 in FIG. 8). At this time, the subcooling degree of the refrigerant on the outlet side of the exterior heat exchanger 17 (as indicated at the point d4 in FIG. 8) is adjusted to approach the target subcooling degree KSC. In this way, the refrigeration cycle device 10 can achieve the high COP.

The low-pressure refrigerant decompressed by the expansion valve 19 for air cooling flows into the interior evaporator 20, and absorbs heat from the air for the interior blown from the blower 32 to evaporate itself (as indicated from the point d5 to a point d6 in FIG. 8). In this way, the air for the interior is cooled, thereby achieving the air cooling of the vehicle interior, like the air cooling-warming up mode. The operations following this step will be the same as those in the air cooling-warming up mode.

Thus, in the air cooling-non-temperature adjustment mode, the air for the interior can be cooled by the interior evaporator 20, thereby cooling the vehicle interior. The air for the battery is not heated by the heat exchanger 15 for the battery, and the warming-up of the battery 55 is not performed.

As mentioned above, the refrigeration cycle device 10 of this embodiment can heat the air for the interior by the interior condenser 12 when heating the vehicle interior, and can also cool the air for the interior by the interior evaporator 20 when cooling the vehicle interior. Further, when warming up the battery 55, the battery 55 can be indirectly heated by heating the air for the battery in the heat exchanger 15 for the battery.

That is, the refrigeration cycle device 10 of this embodiment can adjust the temperatures of a plurality of temperature adjustment objects (fluids to be temperature adjustment), specifically, the air for the interior and the air for the battery.

In the air heating-warming up mode, the air for the interior is heated using the high-pressure refrigerant discharged from the compressor 11 as a heat source, and the air for the battery is heated using the intermediate-pressure refrigerant decompressed by the high-stage side expansion valve 13a as another heat source, so that the temperature of the air for the battery can be adjusted in a temperature range that is lower than that of the air for the interior.

At this time, the temperature of the refrigerant that dissipates heat therefrom in the heat exchanger 15 for the battery can be easily adjusted by adjusting the opening degree of the high-stage side expansion valve 13a, and thereby it can easily adjust the temperature of the air for the battery. As a result, the battery temperature Tb can be more easily controlled within the reference temperature range, thereby sufficiently utilizing the capacity of the battery 55.

Further, even though the flow rate of the refrigerant circulating through the cycle fluctuates due to the adjustment of the opening degree of the high-stage side expansion valve 13a, the accumulator 21 can suppress the occurrence of liquid compression of the compressor 11.

In the refrigeration cycle device 10 of this embodiment, in the air heating-warming up mode, the refrigerant discharge capacity of the compressor 11 is adjusted to thereby adjust the temperature of the air for the interior to be heated by the interior condenser 12. Furthermore, the opening degree of the high-stage side expansion valve 13a is adjusted to thereby adjust the temperature of the air for the battery to be heated by the heat exchanger 15 for the battery. Accordingly, the battery temperature Tb can be adjusted or controlled without being affected by the adjustment of the temperature of the air for the interior.

In the refrigeration cycle device 10 of this embodiment, in the air heating-non-temperature adjustment mode, the high-stage side expansion valve 13a is brought into the throttle state, and the low-stage side expansion valve 13b is fully opened, so that the saturated temperature of the refrigerant in the heat exchanger 15 for the battery is set lower than the outside air temperature. Thus, the refrigerant in the heat exchanger 15 for the battery can evaporate, thereby preventing the liquid-phase refrigerant from being retained in the heat exchanger 15 for the battery, and then failing to flow out of the heat exchanger.

This is effective in that large fluctuations in flow rate of the refrigerant circulating through the cycle can be suppressed even when the switching is frequently performed between the air heating-warming up mode and the air heating-non-temperature adjustment mode in order to surely maintain the battery temperature Tb in the reference temperature range as mentioned above. Thus, this embodiment can reduce the size of the accumulator 21, achieving the reduction in size of the entire refrigeration cycle device 10.

As can be seen from the studies by the inventors of the present disclosure, when in the air heating-non-temperature adjustment mode, the high-stage side expansion valve 13a is fully opened with the low-stage side expansion valve 13b being in the throttle state, and the saturated temperature of the refrigerant in the heat exchanger 15 for the battery is higher than the outside air temperature, refrigeration cycle devices applied to general vehicle air conditioners permit about 300 cc of liquid-phase refrigerant to be retained in the heat exchanger 15 for the battery and pipes connected thereto.

In these studies, calculation is done by setting a density of the high-pressure gas-phase refrigerant to 70 g/L, a density of the high-pressure liquid-phase refrigerant to 1000 g/L, and a density of a low-pressure two gas-liquid phase refrigerant to 30 g/L. The term L as used herein means "liter".

In this embodiment, in the air cooling-non-temperature adjustment mode, the temperature of the refrigerant in the heat exchanger 15 for the battery is not adjusted to be lower than the outside air temperature, and thereby it does not affect the fluctuations in flow rate of circulating refrigerant so much. The reason for this is that as mentioned above, the operation in the air cooling-warming up mode is less likely to be performed, and that when switching from the air cooling-warming up mode to the air cooling-non-temperature adjustment mode, the liquid-phase refrigerant is not easily retained in the heat exchanger 15 for the battery.

Since the refrigeration cycle device 10 of this embodiment includes the bypass passage 16, the refrigerant does not flow through the heat exchanger 15 for the battery in the air heating-non-temperature adjustment mode and in the air cooling-non-temperature adjustment mode. Thus, even in the non-temperature adjustment mode, the nonuniform temperature distribution of the battery 55 can also be suppressed by operating the blower 52 of the battery pack 50.

(Second Embodiment)

Although the first embodiment has described the refrigeration cycle device that can switch between the warming-up mode of warming up the battery 55 and the non-temperature adjustment mode of not warming up the battery 55, this embodiment will describe the refrigeration cycle device 10 that can further perform a cooling mode operation for cooling the battery 55.

Figure 10:
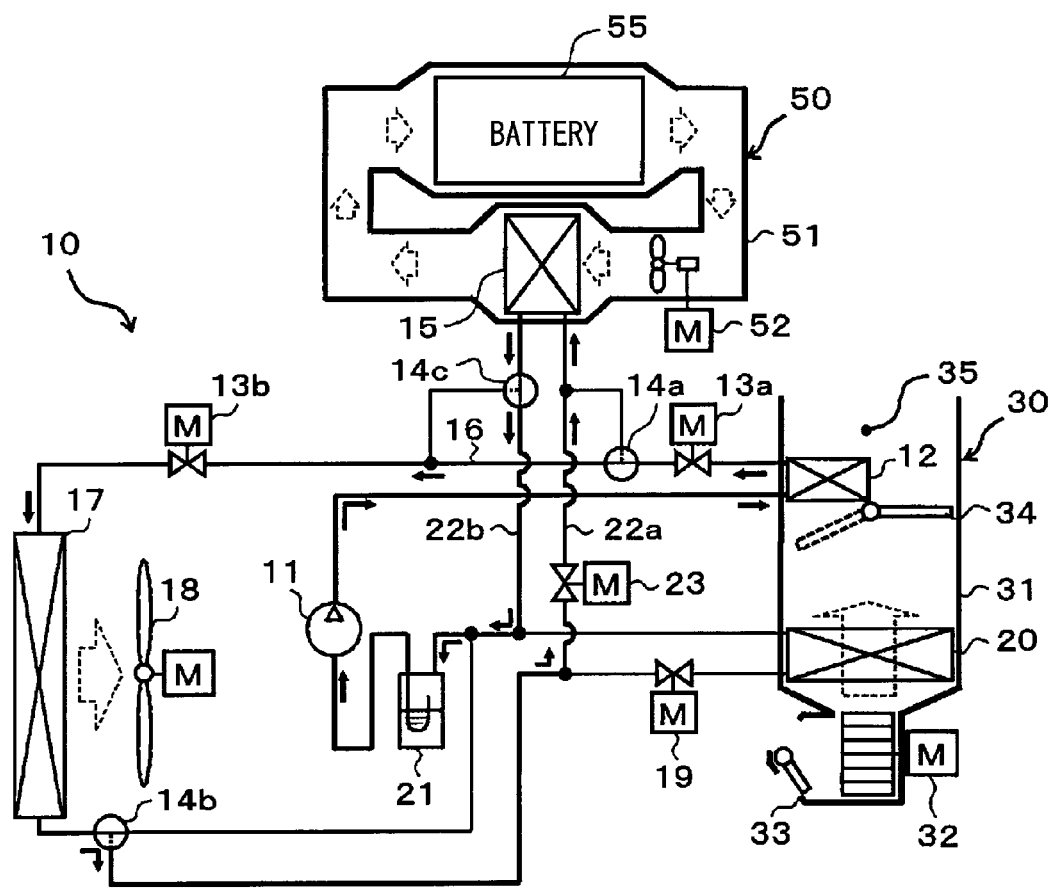
FIG. 10 is an exemplary diagram showing a refrigerant flow in an air heating-cooling mode of a refrigeration cycle device according to a second embodiment.
Figure 11:
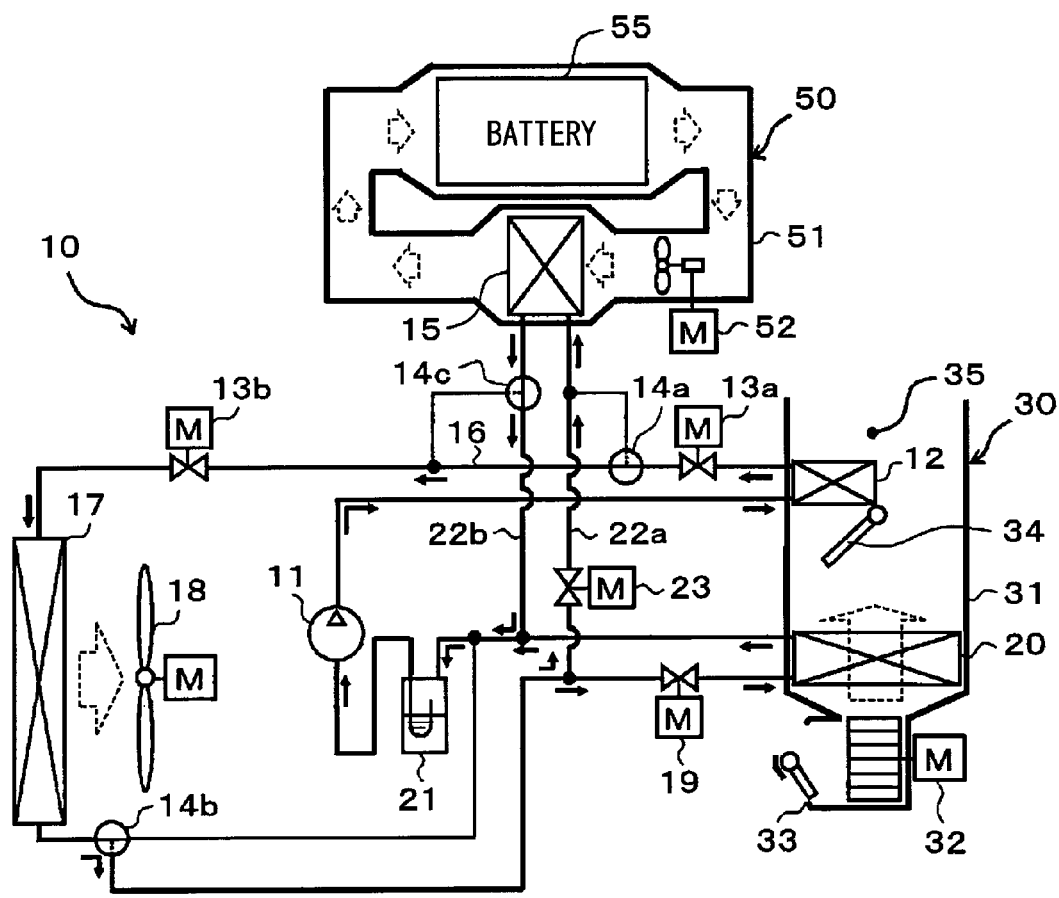
FIG. 11 is an exemplary diagram showing a refrigerant flow in an air cooling-cooling mode of the refrigeration cycle device in the second embodiment.

First, the entire configuration of the refrigeration cycle device 10 of this embodiment will be described below using FIGS. 10 and 11. Referring to FIGS. 10 and 11, the same or equivalent part as that in the first embodiment is designated by the same reference numeral. The same goes for the following figures. FIGS. 10 and 11 show the flows of the refrigerant in the air heating-cooling mode as well as in the air cooling-cooling mode by solid arrows.

As can be seen from FIGS. 10 and 11, as compared to the structure of the first embodiment, in the refrigeration cycle device 10 of this embodiment, a first connection passage 22a is provided to connect the inlet side of the expansion valve 19 for air cooling to the refrigerant inlet side of the heat exchanger 15 for the battery. A second connection passage 22b is provided to connect the refrigerant outlet side of the heat exchanger 15 for the battery to the inlet side of the accumulator 21.

Further, an expansion valve 23 for cooling is disposed in the first connection passage 22a so as to decompress the refrigerant flowing into the heat exchanger 15 for the battery in the cooling mode. The expansion valve 23 for cooling has the same basic structure as that of the expansion valve 19 for air cooling. In the second connection passage 22b, a third three-way valve 14c is disposed as a refrigerant circuit switch. The three-way valve 14c is an electric three-way valve that has the same structure as that of each of the first and second three-way valves 14a and 14b.

Specifically, the third three-way valve 14c switches between a refrigerant circuit for establishing a connection between the refrigerant outlet side of the heat exchanger 15 for the battery and the inlet side of the low-stage side expansion valve 13b, and another refrigerant circuit for establishing a connection between the refrigerant outlet side of the heat exchanger 15 for the battery and the inlet side of the accumulator 21. Other structures except for the above-mentioned structures of the refrigeration cycle device 10, interior air conditioning unit 30, and battery pack 50 in this embodiment are the same as those in the first embodiment.

Next, the operation of the refrigeration cycle device 10 with the above-mentioned structure in this embodiment will be described below. As mentioned above, in the refrigeration cycle device 10, the operating modes for air conditioning include the air heating mode and the air cooling mode, while the operating modes for warming-up of the battery 55 include the cooling mode of cooling the battery 55, in addition to the warming up mode and the non-temperature adjustment mode.

Specifically, the cooling mode of cooling the battery 55 is performed when the battery temperature Tb is equal to or higher than the third reference temperature Tk3 (35° C. in this embodiment) so as to maintain the battery temperature Tb within the reference temperature range. Switching to other operating modes is performed in the same way as that in the first embodiment.

Next, a description will be given of the operation in each of the operation modes.

In the air heating-warming up mode, the controller 100 completely closes the expansion valve 19 for air-cooling and the expansion valve 23 for cooling while bringing the high-stage side expansion valve 13a and the low-stage side expansion valve 13b into the throttle state.

Further, the controller 100 controls the operation of the first three-way valve 14a so as to establish a connection between the outlet side of the high-stage side expansion valve 13a and the refrigerant inlet side of the heat exchanger 15 for the battery. The controller 100 also controls the operation of the third three-way valve 14c so as to establish a connection between the refrigerant inlet side of the heat exchanger 15 for the battery and the inlet side of the low-stage side expansion valve 13b. Moreover, the controller 100 controls the operation of the second three-way valve 14b so as to establish a connection between the refrigerant outlet side of the exterior heat exchanger 17 and the inlet side of the accumulator 21.

In this way, the same refrigerant circuit as that in the air heating-warming up mode of the first embodiment is configured. The control operations of other devices to be controlled are the same as those in the air heating-warming-up mode of the first embodiment. Thus, the heating of the vehicle interior and the warming-up of the battery 55 can be achieved in the same way as that in the air heating-warming up mode of the first embodiment.

In the air heating-non-temperature adjustment mode, the controller 100 fully opens the low-stage side expansion valve 13b and completely closes the expansion valve 19 for air cooling and the expansion valve 23 for cooling while bringing the high-stage side expansion valve 13a into the throttle state.

Further, the controller 100 controls the operation of the first three-way valve 14a so as to establish a connection between the outlet side of the high-stage side expansion valve 13a and the inlet side of the bypass passage 16. The controller 100 also controls the operation of the third three-way valve 14c so as to establish a connection between the refrigerant outlet side of the heat exchanger 15 for the battery and the inlet side of the low-stage side expansion valve 13b. Moreover, the controller 100 controls the operation of the second three-way valve 14b so as to establish a connection between the refrigerant outlet side of the exterior heat exchanger 17 and the inlet side of the accumulator 21.

In this way, the same refrigerant circuit as that in the air heating-non-temperature adjustment mode of the first embodiment is configured. Further, the control operations of other devices to be controlled are the same as those in the air heating-non-temperature adjustment mode of the first embodiment. Thus, the air heating of the vehicle interior can be achieved in the same way as that in the air heating-non-temperature adjustment mode of the first embodiment.

The air heating-cooling mode is an operation mode in which the air conditioning of the vehicle interior in the air heating mode is performed while the battery 55 is cooled. More specifically, this operation mode is performed with an operation switch of the operation panel turned on (ON) when heating is selected by the selection switch and the battery temperature Tb is higher than the third reference temperature Tk3.

In the air heating-cooling mode, the controller 100 fully opens the high-stage side expansion valve 13a and the low-stage side expansion valve 13b, and completely closes the expansion valve 19 for air cooling while bringing the expansion valve 23 for cooling into the throttle state.

Further, the controller 100 controls the operation of the first three-way valve 14a so as to establish a connection between the outlet side of the high-stage side expansion valve 13a and the inlet side of the bypass passage 16. The controller 100 also controls the operation of the third three-way valve 14c so as to establish a connection between the refrigerant outlet side of the heat exchanger 15 for the battery and the inlet side of the accumulator 21. Moreover, the controller 100 controls the operation of the second three-way valve 14b so as to establish a connection between the refrigerant outlet side of the exterior heat exchanger 17 and the inlet side of the expansion valve 19 for air cooling.

In this way, in the air heating-cooling mode, the refrigeration cycle device 10 performs switching to the refrigerant circuit for allowing the refrigerant to flow therethrough as indicated by solid arrows of FIG. 10. With the structure of the refrigerant flow path, like the air heating-warming up mode, the controller 100 calculates the target air temperature TAO, and determines the operating states of various devices to be controlled, based on the calculated target air temperature TAO and the detection signal from the sensor group.

For example, an opening degree of the expansion valve 23 for cooling is determined such that the subcooling degree of the refrigerant on the outlet side of the exterior heat exchanger 17 calculated based on the exterior device temperature Ts and the refrigerant pressure Ps on the outlet side of the exterior heat exchanger 17 approaches the target subcooling degree KSC. The control operations of other devices to be controlled are the same as those in the air heating-warming up mode.

Thus, in the air heating-cooling mode, the refrigeration cycle device 10 allows the high-pressure refrigerant discharged from the compressor 11 to flow into the interior condenser 12 to exchange heat with the air for the interior, thereby dissipating heat from the refrigerant, in the same way as the air heating-warming up mode. In this way, the air for the interior is heated, thereby achieving the heating of the vehicle interior. The refrigerant having flowed from the interior condenser 12 flows through the high-stage side expansion valve 13a, the first three-way valve 14a, the bypass passage 16, and the low-stage side expansion valve 13b in that order to flow into the exterior heat exchanger 17.

In the air heating-cooling mode, the high-stage side expansion valve 13a and the low-stage side expansion valve 13b are fully opened, so that the refrigerant having flowed from the interior condenser 12 flows into the exterior heat exchanger 17 without being decompressed. The refrigerant having flowed into the exterior heat exchanger 17 exchanges heat with outside air blown from the blower fan 18 to dissipate heat therefrom, thereby decreasing its enthalpy.

The refrigerant having flowed from the exterior heat exchanger 17 flows into the expansion valve 23 for cooling via the second three-way valve 14b and first connection passage 22a to be decompressed into a low pressure, and then flows into the heat exchanger 15 for the battery. At this time, the subcooling degree of the refrigerant on the outlet side of the exterior heat exchanger 17 is adjusted to approach the target subcooling degree KSC. In this way, the refrigeration cycle device 10 can achieve the high COP.

The low-pressure refrigerant decompressed by the expansion valve 23 for cooling flows into the heat exchanger 15 for the battery, and absorbs heat from the air for the battery blown from the blower 52 of the battery pack 50 to evaporate itself. In this way, the air for the battery is cooled. The cooled air for the battery is blown to the battery 55 by the blower 52, thereby cooling the battery 55.

The refrigerant having flowed out of the heat exchanger 15 for the battery flows into the accumulator 21 via the third three-way valve 14c and the second connection passage 22b. The gas-phase refrigerant separated by the accumulator 21 is sucked into the compressor 11 and compressed therein again.

Thus, in the air heating-cooling mode, the air for the interior can be heated by the interior condenser 12 to thereby heat the vehicle interior, while the air for the battery can be cooled by the heat exchanger 15 for the battery to thereby cool the battery 55.

In the air cooling-warming up mode, the controller 100 fully opens the low-stage side expansion valve 13b while bringing the high-stage side expansion valve 13a and the expansion valve 19 for air cooling into the throttle state, and completely closes the expansion valve 23 for cooling.

Further, the controller 100 controls the operation of the first three-way valve 14a so as to establish a connection between the outlet side of the high-stage side expansion valve 13a and the refrigerant inlet side of the heat exchanger 15 for the battery. The controller 100 also controls the operation of the third three-way valve 14c so as to establish a connection between the refrigerant inlet side of the heat exchanger 15 for the battery and the inlet side of the low-stage side expansion valve 13b. Moreover, the controller 100 controls the operation of the second three-way valve 14b so as to establish a connection between the refrigerant outlet side of the exterior heat exchanger 17 and the inlet side of the expansion valve 19 for air cooling.

In this way, the same refrigerant circuit as that in the air cooling-warming up mode of the first embodiment is configured. The control operations of other devices to be controlled are the same as those in the air cooling-warming up mode of the first embodiment. Thus, the air cooling of the vehicle interior and the warming-up of the battery 55 can be achieved in the same way as that in the air cooling-warming up mode of the first embodiment.

In the air cooling-non-temperature adjustment mode, the controller 100 fully opens the high-stage side expansion valve 13a and the low-stage side expansion valve 13b, and completely closes the expansion valve 23 for cooling while bringing the expansion valve 19 for air cooling into the throttle state.

Further, the controller 100 controls the operation of the first three-way valve 14a so as to establish a connection between the outlet side of the high-stage side expansion valve 13a and the inlet side of the bypass passage 16. The controller 100 also controls the operation of the third three-way valve 14c so as to establish a connection between the refrigerant inlet side of the heat exchanger 15 for the battery and the inlet side of the low-stage side expansion valve 13b. Moreover, the controller 100 controls the operation of the second three-way valve 14b so as to establish a connection between the refrigerant outlet side of the exterior heat exchanger 17 and the inlet side of the expansion valve 19 for air cooling.

In this way, the same refrigerant circuit as that in the air cooling-non-temperature adjustment mode of the first embodiment is configured. The control operations of other devices to be controlled are the same as those in the air cooling-non-temperature adjustment mode of the first embodiment. Thus, the air cooling of the vehicle interior can be achieved in the same way as that in the air cooling-non-temperature adjustment mode of the first embodiment.

The air cooling-cooling mode is an operation mode in which the air conditioning of the vehicle interior in the air cooling mode is performed while the battery 55 is cooled. More specifically, this operation mode is performed with an operation switch of the operation panel turned on (ON) when air cooling is selected by the selection switch and the battery temperature Tb is higher than the third reference temperature Tk3.

In the air cooling-cooling mode, the controller 100 fully opens the high-stage side expansion valve 13a and the low-stage side expansion valve 13b while bringing the expansion valve 23 for cooling and the expansion valve 19 for air cooling into the throttle state.

Further, the controller 100 controls the operation of the first three-way valve 14a so as to establish a connection between the outlet side of the high-stage side expansion valve 13a and the inlet side of the bypass passage 16. The controller 100 also controls the operation of the third three-way valve 14c so as to establish a connection between the refrigerant outlet side of the heat exchanger 15 for the battery and the inlet side of the accumulator 21. Moreover, the controller 100 controls the operation of the second three-way valve 14b so as to establish a connection between the refrigerant outlet side of the exterior heat exchanger 17 and the inlet side of the expansion valve 19 for air cooling.

In this way, in the air cooling-cooling mode, the refrigeration cycle device 10 performs switching to the refrigerant circuit for allowing the refrigerant to flow therethrough as indicated by solid arrows of FIG. 11. With the structure of the refrigerant flow path, like the air heating-warming up mode, the controller 100 calculates the target air temperature TAO, and determines the operating states of various devices to be controlled based on the calculated target air temperature TAO and the detection signal from the sensor group.

For example, opening degrees of the expansion valve 23 for cooling and the expansion valve 19 for air cooling are determined such that the subcooling degree of the refrigerant on the outlet side of the exterior heat exchanger 17 calculated based on the exterior device temperature Ts and the refrigerant pressure Ps on the outlet side of the exterior heat exchanger 17 approaches the target subcooling degree KSC. The control operations of other devices to be controlled are the same as those in the air cooling-warming up mode.

Thus, in the air cooling-cooling mode, the refrigeration cycle device 10 allows the high-pressure refrigerant discharged from the compressor 11 to flow into the interior condenser 12 to exchange heat with the air for the interior, thereby dissipating heat from the refrigerant, in the same way as the air cooling-warming up mode. In this way, part of the air for the interior is heated. The refrigerant having flowed from the interior condenser 12 flows through the high-stage side expansion valve 13a, the first three-way valve 14a, the bypass passage 16, and the low-stage side expansion valve 13b in that order to flow into the exterior heat exchanger 17.

In the air cooling-cooling mode, the high-stage side expansion valve 13a and the low-stage side expansion valve 13b are fully opened, so that the refrigerant having flowed from the interior condenser 12 flows into the exterior heat exchanger 17 without being decompressed. The refrigerant having flowed into the exterior heat exchanger 17 exchanges heat with outside air blown from the blower fan 18 to dissipate heat therefrom, thereby decreasing its enthalpy.

The refrigerant having flowed out of the exterior heat exchanger 17 flows into the expansion valve 19 for air cooling and the expansion valve 23 for cooling via the second three-way valve 14b. The refrigerant having flowed into the expansion valve 19 for air cooling is decompressed into a low pressure and then flows into the interior evaporator 20. The refrigerant flowing into the interior evaporator 20 absorbs heat from the air for the interior blown from the blower 32 to evaporate itself. In this way, the air for the interior is cooled.

Then, a part of the air for the interior cooled by the interior evaporator 20 is heated again by the interior condenser 12, whereby the air for the interior is adjusted to be at a temperature close to the target air temperature TAO to thereby achieve the cooling of the vehicle interior. The refrigerant having flowed from the interior evaporator 20 flows into the accumulator 21.

On the other hand, the refrigerant having flowed into the expansion valve 23 for cooling is decompressed into the low pressure to flow into the heat exchanger 15 for the battery.

Then, the refrigerant absorbs heat from the air for the battery blown from the blower 52 of the battery pack 50 to evaporate itself. In this way, the air for the battery is cooled. The cooled air for the battery is blown to the battery 55 by the blower 52, thereby cooling the battery 55.

The refrigerant flowing out of the heat exchanger 15 for the battery flows into the accumulator 21 together with the refrigerant flowing from the interior evaporator 20. The gas-phase refrigerant separated by the accumulator 21 is sucked into the compressor 11 and compressed therein again.

Thus, in the air cooling-cooling mode, the air for the interior can be cooled by the interior evaporator 20 to thereby cool the air in the vehicle interior, while the air for the battery can be cooled by the heat exchanger 15 for the battery to thereby cool the battery 55.

As mentioned above, the refrigeration cycle 10 of this embodiment can adjust the temperature of the air for the battery in a temperature range that is lower than the temperature of the air for the interior, thereby obtaining the same effects as those of the first embodiment. Further, the refrigeration cycle device 10 of this embodiment can cool the air for the battery in the air heating-cooling mode or in the air cooling-cooling mode, thereby indirectly cooling the battery 55.

The battery 55 produces heat by itself during charge and discharge. Cooling the battery 55 like this embodiment is very effective in surely maintaining the battery temperature Tb within the reference temperature range.

As shown in FIG. 11, in the refrigeration cycle device 10 of this embodiment, the interior evaporator 20 and the heat exchanger 15 for the battery are connected in parallel with respect to the refrigerant flow in the air cooling-cooling mode. Thus, it is necessary to render a decompression amount of refrigerant in the expansion valve 19 for air cooling equal to that of refrigerant in the expansion valve 23 for cooling, thereby causing the refrigerant evaporation temperature in the interior evaporator 20 to be equal to that in the heat exchanger 15 for the battery.

In contrast, when the refrigerant evaporator temperature in the interior evaporator 20 is made different from the refrigerant evaporation temperature in the heat exchanger 15 for the battery, a refrigerant decompressor may be added in a refrigerant passage leading from the refrigerant outlet side of the interior evaporator 20 to a connection portion with the second connection passage 22b, or in the second connection passage 22b. For example, when the refrigerant evaporation temperature in the heat exchanger 15 for the battery is higher than the refrigerant evaporation temperature in the interior evaporator 20, a throttle valve may be added to the second connection passage 22b.

(Third Embodiment)

In the example described in the first embodiment, in the air heating-warming up mode, the refrigerant discharge capacity of the compressor 11 is controlled to cause the air temperature TAV to approach the target air temperature TAO, and the opening degree of the high-stage side expansion valve 13a is controlled to maintain the temperature of the battery 55 within the reference temperature range.

In such control of the air heating-warming up mode, first, the heat included in the refrigerant discharged from the compressor 11 is used to heat the air for the interior so as to be capable of achieving the sufficient heating of the vehicle interior, and then the remaining heat is used to heat the air for the battery. That is, the air heating-warming up mode described in the first embodiment can be expressed as an operation mode in which heating of the vehicle interior is prioritized over the warming-up of the battery 55 (namely, heating priority mode).

For example, on a traveling condition or the like in which an electric vehicle parked under a low-temperature environment has to be quickly accelerated or start to climb a slope immediately after the start-up of a vehicle system, it is necessary to output large electric power from the battery 55. For this reason, the battery 55 has to be quickly warmed up directly after the start-up of the vehicle system. On such a traveling condition, the warming-up of the battery 55 is desirably prioritized over the heating of the vehicle interior.

Now, this embodiment will describe the refrigeration cycle device 10 that can perform the warming-up priority mode of prioritizing the warming-up of the battery 55 over the heating of the vehicle interior, in addition to the respective operation modes described in the first embodiment.

Specifically, the refrigeration cycle device 10 of this embodiment is provided with a warming-up priority switch 100b for outputting a request signal that requires the operation panel to prioritize the warming-up of the battery 55 over the heating of the vehicle interior by a passenger's (user's) operation. In a control program of this embodiment, under the operating condition for execution of the air heating-warming up mode, when the warming-up priority switch 100b is turned on (ON), the operation of the warming-up priority mode is performed.

That is, the warming-up priority switch 100b of this embodiment serves as a switch for selecting one of the air heating-warming up mode of prioritizing the heating of the vehicle interior and the warming-up priority mode of prioritizing the warming-up of the battery, that is, as a heating object selector that preferentially selects an object to be heated from the air for the interior and the air for the battery. The structures of other components of the refrigeration cycle device 10 except for the above points are the same as those of the first embodiment.

Next, the operation of the refrigeration cycle device 10 with the above-mentioned structure in this embodiment will be described below. As mentioned above, the refrigeration cycle device 10 of this embodiment can carry out the warming-up priority mode in addition to the respective operation modes described in the first embodiment.

In the warming-up priority mode, the controller controls the operations of the high-stage side expansion valve 13a, the low-stage side expansion valve 13b, the expansion valve 19 for air cooling, the first and second three-way valves 14a and 14b, and the like in the same way as the air heating-warming up mode. Thus, in the warming-up priority mode, switching is performed to the refrigerant circuit for allowing the refrigerant to flow in the same way as the air heating-warming up mode.

Further, the controller determines a control voltage which is to be output to the electric motor of the blower 32, such that the control voltage decreases from a previous value determined in the air heating-warming up mode by a predetermined amount. That is, in the warming-up priority mode, the blowing capacity of the blower 32 is lower than that in the air heating-warming up mode. The control operations of other devices to be controlled are the same as those in the air heating-warming-up mode of the first embodiment.

Figure 13:
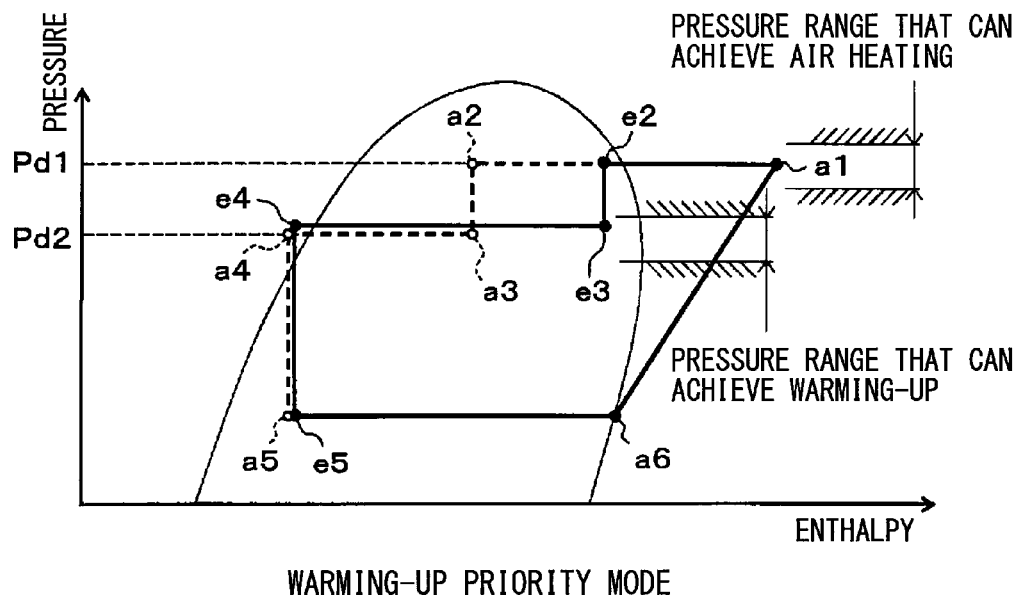
FIG. 13 is a Mollier chart showing the state of refrigerant in a warming-up priority mode of a refrigeration cycle device according to a third embodiment.

Thus, the refrigeration cycle device 10 in the warming-up priority mode changes the state of the refrigerant as illustrated by a thick solid line in a Mollier chart of FIG. 13. As shown in FIG. 13, the change of the refrigerant state in the air heating-warming up mode is represented by a broken line, while the same state of the refrigerant as that in the air heating-warming up mode described in the first embodiment is designated by the same reference character. The same goes for FIGS. 14 and 15.

First, a high-pressure refrigerant discharged from the compressor 11 flows into the interior condenser 12, and exchanges heat with the air for the interior to dissipate heat therefrom (as indicated from the point a1 to a point e2 in FIG. 13). At this time, the refrigerant pressure within the interior condenser 12 is adjusted to such a value that allows the air temperature TAV to heat the vehicle interior in the same way as the air heating-warming up mode. In the warming-up priority mode, however, the blowing capacity of the blower 32 is reduced, whereby the amount of heat dissipated from the refrigerant in the interior condenser 12 is decreased as compared to that in the air heating-warming up mode.

The refrigerant flowing from the interior condenser 12 is decompressed by the high-stage side expansion valve 13a into an intermediate pressure (as indicated from the point e2 to a point e3 in FIG. 13). The refrigerant decompressed by the high-stage side expansion valve 13a flows into the heat exchanger 15 for the battery via the first three-way valve 14a. The refrigerant flowing into the heat exchanger 15 for the battery exchanges heat with the air for the battery to dissipate heat therefrom (as indicated from the point e3 to a point e4 in FIG. 13).

At this time, the refrigerant pressure within the heat exchanger 15 for the battery is adjusted to such a pressure that sets the battery temperature Tb within the reference temperature range. Further, in the warming-up priority mode, the amount of heat dissipated from the refrigerant in the interior condenser 12 is decreased as compared to that in the air heating-warming up mode, which leads to an increase in heat dissipated from the refrigerant in the heat exchanger 15 for the battery.

The refrigerant flowing from the heat exchanger 15 for the battery is decompressed by the low-stage side expansion valve 13b into a low pressure (as indicated from the point e4 to a point e5 in FIG. 13). At this time, the subcooling degree of the refrigerant on the outlet side of the heat exchanger 15 for the battery (as indicated at the point e4 in FIG. 13) is adjusted to approach a target subcooling degree KSC. The operations following the above step are the same as those in the air heating-warming up mode of the first embodiment.

As mentioned above, in the warming-up priority mode, the blowing capacity of the blower 32 is decreased as compared to the air heating-warming up mode, so that it can decrease the amount of heat dissipated from the refrigerant in the interior condenser 12, thereby increasing the amount of heat dissipated from the refrigerant in the heat exchanger 15 for the interior. Thus, the heat for use in heating the air for the battery can be ensured on a priority basis over the heat for use in heating the air for the battery. As a result, the warming-up priority mode can achieve the warming up of the battery more quickly than the air heating-warming up mode.

In the warming-up priority mode, the blowing capacity of the blower 32 is reduced, and thereby it might reduce the heating capacity of the vehicle interior as compared to the air heating-warming up mode. In contrast, in this embodiment, the warming-up priority switch 100b can be used as the heating object selector to perform switching to the warming-up priority mode according to the passenger's intention. Thus, even though the heating capacity is reduced, the passenger rarely feels uncomfortable. The operation in the warming-up priority mode of this embodiment may be executed by the refrigeration cycle device 10 described in the second embodiment.

(Fourth Embodiment)

This embodiment differs from the third embodiment in that the control of the warming-up priority mode is changed by way of example. Specifically, under the operating condition for execution of the air heating-warming up mode, when the warming-up priority switch 100b is turned on (ON), the refrigeration cycle device 10 of this embodiment decreases the target air temperature TAO by a predetermined amount.

Figure 14:
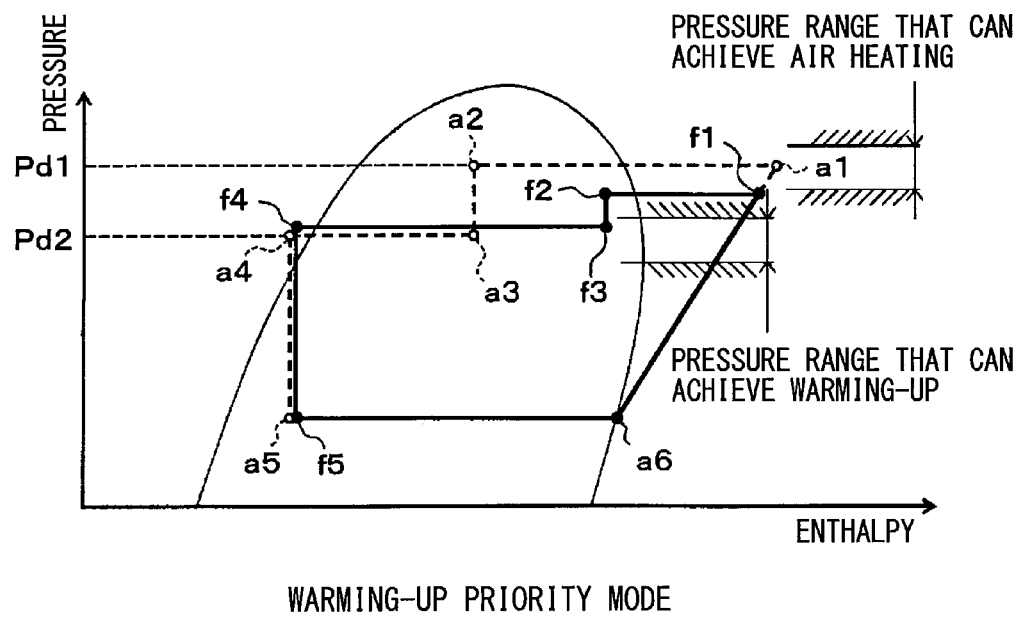
FIG. 14 is a Mollier chart showing the state of refrigerant in a warming-up priority mode of a refrigeration cycle device according to a fourth embodiment.

Thus, in the warming-up priority mode of this embodiment, the pressure of high-pressure refrigerant (as indicated by a point f1 of FIG. 14) discharged from the compressor 11 is decreased as compared to that in the air heating-warming up mode as indicated by a thick solid line of a Mollier chart of FIG. 14. Further, a high-pressure refrigerant discharged from the compressor 11 flows into the interior condenser 12, and exchanges heat with the air for the interior to dissipate heat therefrom (as indicated from the point f1 to a point f2 in FIG. 14).

At this time, because the refrigerant pressure inside the interior condenser 12 is lower than that in the air heating-warming up mode, it can reduce a difference in temperature between the refrigerant temperature in the interior condenser 12 and the outside air temperature as compared to the air heating-warming up mode, thereby decreasing the amount of heat dissipated from the refrigerant in the interior condenser 12.

The refrigerant having flowed from the interior condenser 12 is decompressed by the high-stage side expansion valve 13a into an intermediate pressure (as indicated from the point f2 to a point f3 in FIG. 14). The refrigerant decompressed by the high-stage side expansion valve 13a flows into the heat exchanger 15 for the battery via the first three-way valve 14a.

The refrigerant flowing into the heat exchanger 15 for the battery exchanges heat with the air for the battery to dissipate heat therefrom (as indicated from the point f3 to a point f4 in FIG. 14).

At this time, the refrigerant pressure within the heat exchanger 15 for the battery is adjusted to such a pressure that sets the battery temperature Tb within the reference temperature range. Further, in the warming-up priority mode, the amount of heat dissipated from the refrigerant in the interior condenser 12 is decreased as compared to that in the air heating-warming up mode, which leads to an increase in heat dissipated from the refrigerant in the heat exchanger 15 for the battery.

The refrigerant flowing from the heat exchanger 15 for the battery is decompressed by the low-stage side expansion valve 13b into a low pressure (as indicated from the point f4 to a point f5 in FIG. 14). At this time, the subcooling degree of the refrigerant on the outlet side of the heat exchanger 15 for the battery (as indicated at the point f4 in FIG. 14) is adjusted to approach a target subcooling degree KSC. The operations following the above step are the same as those in the air heating-warming up mode of the first embodiment.

Thus, even in the refrigeration cycle device 10 of this embodiment, in the warming-up priority mode, the amount of heat dissipated from the refrigerant in the interior condenser 12 can be reduced, while the amount of heat dissipated from the refrigerant in the heat exchanger 15 for the battery can be increased, so that the warming-up of the battery 55 is prioritized over the heating of the vehicle interior. As a result, the same effects as those of the third embodiment can be obtained. The operation in the warming-up priority mode of this embodiment may be executed by the refrigeration cycle device 10 described in the second embodiment.

(Fifth Embodiment)

This embodiment differs from the third embodiment in that the control of the warming-up priority mode is changed by way of example. Specifically, in the refrigeration cycle device 10 of this embodiment, under the operating condition for execution of the air heating-warming up mode, when the warming-up priority switch 100b is turned on (ON), the refrigerant discharge capacity of the compressor 11 is determined such that the high-stage side expansion valve 13a is fully opened, while the intermediate pressure side refrigerant pressure Pd2 approaches the target intermediate pressure Pdt2.

Note that as mentioned in the first embodiment, the target intermediate pressure Pdt2 is a refrigerant pressure that is determined such that the temperature of the battery 55 is within the above-mentioned reference temperature range (10 to 40° C.). That is, the refrigerant discharge capacity of the compressor 11 in this embodiment is determined to cause the temperature of the battery 55 within the reference temperature range.

Figure 15:
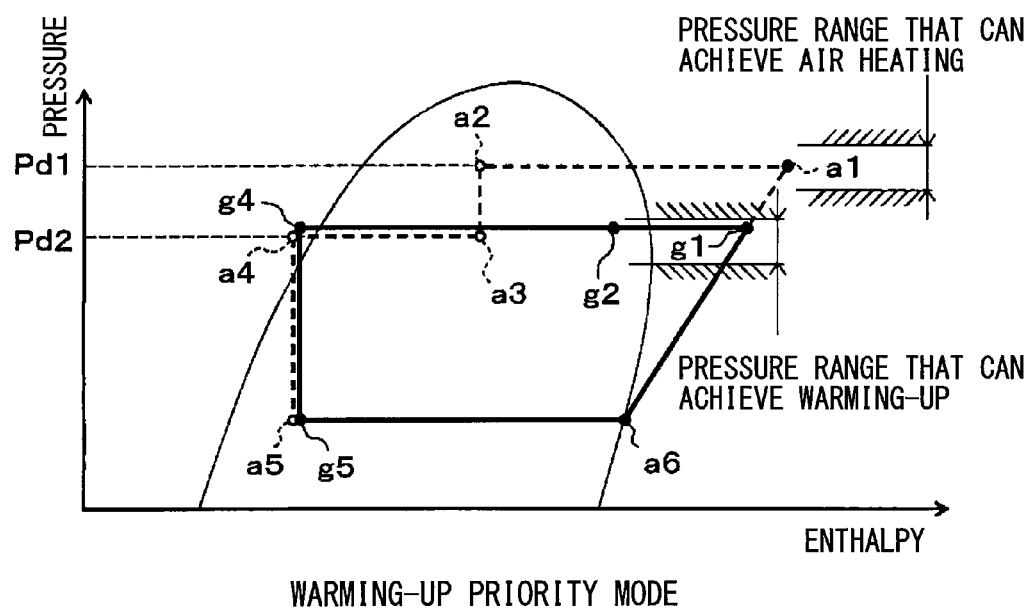
FIG. 15 is a Mollier chart showing the state of refrigerant in a warming-up priority mode of a refrigeration cycle device according to a fifth embodiment.

Thus, in the warming-up priority mode of this embodiment, the pressure of high-pressure refrigerant (as indicated by a point g1 of FIG. 15) discharged from the compressor 11 becomes the target intermediate pressure Pdt2, which is decreased as compared to that in the air heating-warming up mode as indicated by a thick solid line of a Mollier chart of FIG. 15. Further, a high-pressure refrigerant discharged from the compressor 11 flows into the interior condenser 12, and exchanges heat with the air for the interior to dissipate heat therefrom (as indicated from the point g1 to a point g2 in FIG. 15).

At this time, the refrigerant pressure inside the interior condenser 12 is lower than that in the air heating-warming up mode, and thereby it reduces a difference in temperature between the refrigerant temperature in the interior condenser 12 and the outside air temperature as compared to the air heating-warming up mode, thereby decreasing the amount of heat dissipated from the refrigerant in the interior condenser 12.

Since the high-stage side expansion valve 13a is fully opened, the refrigerant having flowed from the interior condenser 12 flows into the heat exchanger 15 for the battery without being decompressed by the high-stage side expansion valve 13a. The refrigerant flowing into the heat exchanger 15 for the battery exchanges heat with the air for the battery to dissipate heat therefrom (as indicated from the point g2 to a point g4 in FIG. 15).

At this time, the refrigerant pressure within the heat exchanger 15 for the battery is adjusted to such a pressure that sets the battery temperature Tb within the reference temperature range. Further, in the warming-up priority mode, the amount of heat dissipated from the refrigerant in the interior condenser 12 is decreased as compared to that in the air heating-warming up mode, which leads to an increase in heat dissipated from the refrigerant in the heat exchanger 15 for the battery.

The refrigerant flowing from the heat exchanger 15 for the battery is decompressed by the low-stage side expansion valve 13b into a low pressure (as indicated from the point g4 to a point g5 in FIG. 15). At this time, the subcooling degree of the refrigerant on the outlet side of the heat exchanger 15 for the battery (as indicated at the point g4 in FIG. 15) is adjusted to approach the target subcooling degree KSC. The operations following the above step are the same as those in the air heating-warming up mode of the first embodiment.

Thus, even in the refrigeration cycle device 10 of this embodiment, in the warming-up priority mode, the amount of heat dissipated from the refrigerant in the interior condenser 12 can be reduced, while the amount of heat dissipated from the refrigerant in the heat exchanger 15 for the battery can be increased, so that the warming-up of the battery 55 is prioritized over the heating of the vehicle interior. As a result, the same effects as those of the third embodiment can be obtained. The operation in the warming-up priority mode of this embodiment may be executed by the refrigeration cycle device 10 described in the second embodiment.

(Other Embodiments)

The present disclosure is not limited to the above embodiments, and various modifications and changes can be made to those embodiments without departing from the scope of the invention.

(1) In the above-mentioned embodiments, the heat exchanger 15 for the battery exchanges heat between the refrigerant and the air (gas) for the battery as a heat medium, thereby indirectly heating or cooling the battery 55. However, the heat medium is not limited thereto. For example, the liquid heat medium (ethylene glycol solution) or the like may be used.

In this case, a liquid-refrigerant heat exchanger is preferably adopted as the heat exchanger 15 for the battery that exchanges heat between the heat medium and the refrigerant. A water pump for pressure-feeding the heat medium, a heat medium passage formed inside or outside the battery 55, and a liquid-refrigerant heat exchanger are preferably connected in a ring-like shape by pipes in that order to form a heat medium circulation circuit.

Further, the refrigerant may directly heat or cool the battery 55. For example, refrigerant passages are formed in the outer periphery of or inside the battery 55, and these refrigerant passages may form a heat exchanger structure for directly exchanging heat between the battery 55 and the refrigerant that is integrally formed with the battery 55.

(2) Although the refrigeration cycle device 10 in the above-mentioned embodiments is applied to the electric vehicle by way of example, it is obvious that the refrigeration cycle device 10 may be applied to normal vehicles that use a driving force for traveling produced by an internal combustion engine, and hybrid vehicles that use a driving force for traveling produced by both the internal combustion engine and the electric motor for traveling.

In applying the refrigeration cycle device of the invention to the vehicle with the internal combustion engine, a heater core may be provided for heating the air for the interior using coolant of the internal combustion engine as a heat source. Further, the refrigeration cycle device 10 may be applied to any device other than the vehicles.

Figure 12:
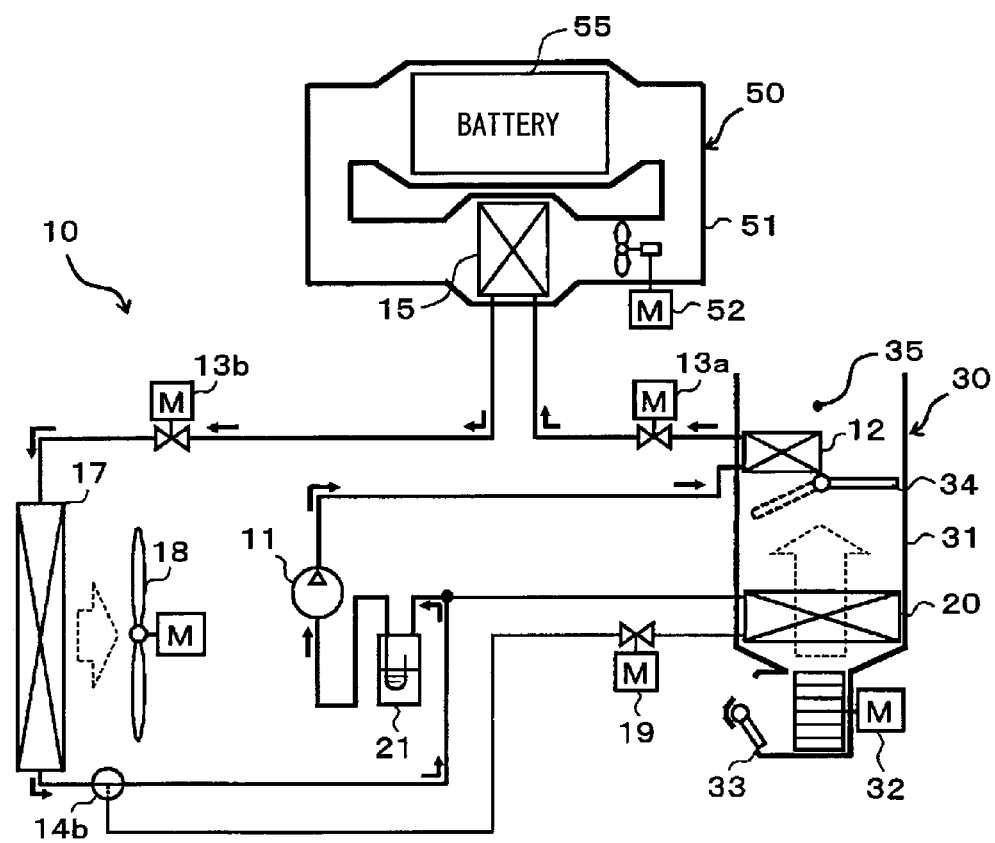
FIG. 12 is an exemplary diagram showing a refrigerant flow in an air heating-non-temperature adjustment mode of the refrigeration cycle device in another embodiment.

(3) In the above-mentioned first embodiment, the first three-way valve 14a and the bypass passage 16 are provided by way of example. However, as shown in the entire configuration diagram of FIG. 12, these elements may be removed. With this arrangement, for example, in the air heating-non-temperature adjustment mode or in the air cooling-non-temperature adjustment mode, the operation of the blower 52 in the battery pack 50 may be stopped.

A door having the same structure as that of the air mix door 34 is provided on the upstream side of the heat exchanger 15 for the battery, and thereby it may suppress the heat exchange between the air for the battery and the refrigerant in the heat exchanger for the battery by inhibiting the inflow of the air for the battery blown from the blower 52 to the heat exchanger 15 for the battery in the air heating-non-temperature adjustment mode or in the air cooling-non-temperature adjustment mode.

(4) In the above-mentioned embodiment, for example, a variable throttle with a completely closing function is used as the expansion valve 19 for air cooling or expansion valve 23 for cooling. Alternatively, a throttle (including a fixed throttle) without the completely closing function, and an opening/closing valve connected to the throttle in series and adapted to open and close a refrigerant passage may be adopted to exhibit the same function.

A variable throttle with a fully opening function is adopted as the low-stage side expansion valve 13b. Alternatively, the low-stage side expansion valve may be constituted of a fixed throttle including an orifice or capillary tube, a bypass passage for bypassing the throttle, and an opening/closing valve for opening and closing the bypass passage. The first to third three-way valves 14a to 14c may be constituted of a combination of a plurality of opening/closing valves.

(5) In the above-mentioned embodiments, the refrigeration cycle device 10 is provided that can achieve the air cooling and heating of the vehicle interior by switching the refrigerant circuit. However, the refrigeration cycle device 10 may be constituted as a device dedicated to heating. In this case, the expansion valve 19 for air cooling, the interior evaporator 20, and the like may be removed.

(6) Although in the above-mentioned embodiments, the temperature detector for use in detecting the battery temperature Tb is a temperature sensor for detecting the temperature of a main body of the secondary battery 55 by way of example, the temperature detector is not limited thereto. For example, a temperature detector for detecting the temperature of the air for the battery directly after having passed through the battery 55 may be adopted.

(7) Although in the above-mentioned third to fifth embodiments, the warming-up priority switch 100b is adopted as the heating object selector by way of example, the heating object selector is not limited thereto.

For example, under the operating condition for executing the air heating-warming up mode, suppose that the vehicle is determined to approach a place that requires the battery 55 to output a high electric power during traveling to a preset destination, especially, in quick acceleration, in traveling at high speed, in ascending a slope, based on information output from a car navigation system or the like. In such a case, the heating object selector may be configured by a control program for selecting the battery 55 as the heating object to be preferentially heated.

A storage portion is provided for storing therein a traveling state of the vehicle. Based on information stored in the storage portion, the heating object selector may be configured by a control program for selecting the battery 55 as the heating object to be preferentially heated. For example, regardless of the battery temperature Tb being below the reference temperature range, suppose that an operating condition in which the battery 55 is more likely to output a higher electric power is estimated, and then the estimated operation condition is determined to correspond to an operating condition in which there is the high possibility that the battery 55 outputs the higher electric power. In such a case, the battery 55 is selected as the heating object.

What is claimed is:
1. A refrigeration cycle device comprising:
a compressor compressing and discharging a refrigerant;

an air heat exchanger that heats air to be blown into a space to be air conditioned using the refrigerant discharged from the compressor as a heat source;

a high-stage side decompressor decompressing the refrigerant flowing out of the air heat exchanger, the high-stage side decompressor being configured to be capable of changing an opening degree of the high-stage side decompressor;

a battery heat exchanger that heats a battery using the refrigerant decompressed by the high-stage side decompressor as another heat source;

a low-stage side decompressor decompressing the refrigerant flowing out of the battery heat exchanger;

an exterior heat exchanger exchanging heat between the refrigerant decompressed by the low-stage side decompressor and outside air to evaporate the refrigerant;

an accumulator separating the refrigerant flowing out of the exterior heat exchanger into gas-phase refrigerant and liquid-phase refrigerant, to allow the separated gas-phase refrigerant to flow toward a suction side of the compressor;

a target temperature determination portion determining a target temperature of the air;

a heating object selector that selects the air flowing in the air heat exchanger or the battery as a heating object to be preferentially heated; and a controller that controls a refrigerant discharge capacity of the compressor such that an air temperature heated by the air heat exchanger approaches the target temperature, and controls the opening degree of the high-stage side decompressor such that a temperature of the battery is maintained within a predetermined reference temperature range, wherein the target temperature determination portion lowers the target temperature when the heating object selector selects the battery, as compared to that when the heating object selector selects the air.

2. The refrigeration cycle device according to claim 1, wherein the low-stage side decompressor is configured to be capable of changing an opening degree of the low-stage side decompressor, and the controller controls the opening degree of the low-stage side decompressor such that a subcooling degree of the refrigerant flowing from the battery heat exchanger approaches a predetermined reference subcooling degree.

3. The refrigeration cycle device according to claim 1, wherein in an air heating-non-temperature adjustment mode in which the air is heated without adjusting the temperature of the battery, the controller controls the opening degree of the high-stage side decompressor such that a saturated temperature of the refrigerant in the battery heat exchanger is lower than an outside air temperature.

4. The refrigeration cycle device according to claim 3, wherein, in the air heating-non-temperature adjustment mode, the controller controls the opening degree of the low-stage side decompressor to be fully open.

5. The refrigeration cycle device according to claim 3, wherein in the air heating-non-temperature adjustment mode, the controller controls the opening degree of the high-stage side decompressor such that a subcooling degree of the refrigerant flowing from the air heat exchanger approaches a predetermined reference subcooling degree.

6. The refrigeration cycle device according to claim 1, further comprising:

a blower blowing the air toward the air heat exchanger, wherein the controller decreases a blowing capacity of the blower when the heating object selector selects the battery as the heating object, as compared to a blowing capacity of the blower when the heating object selector selects the air as the heating object.

7. The refrigeration cycle device according to claim 1, wherein when the heating object selector selects the battery as the heating object, the controller controls the opening degree of the high-stage side decompressor such that the high-stage side decompressor is fully open, and the controller controls the refrigerant discharge capacity of the compressor such that the temperature of the battery is maintained within the predetermined reference temperature range.

8. The refrigeration cycle device according to claim 1, wherein the heating object selector is a selector switch that is operated by a user and selects the air or the battery as the heating object depending on a user's operation.

* * * * *